(12) United States Patent
Kortunov et al.

(10) Patent No.: US 8,715,397 B2
(45) Date of Patent: May 6, 2014

(54) MIXED AMINE AND NON-NUCLEOPHILIC BASE CO2 SCRUBBING PROCESS FOR IMPROVED ADSORPTION AT INCREASED TEMPERATURES

(75) Inventors: Pavel Kortunov, Flemington, NJ (US); Lisa S. Baugh, Ringoes, NJ (US); David C. Calabro, Bridgewater, NJ (US); Michael Siskin, Westfield, NJ (US); Preeti Kamakoti, Summit, NJ (US); Quanchang Li, Dayton, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 196 days.

(21) Appl. No.: 13/228,869

(22) Filed: Sep. 9, 2011

(65) Prior Publication Data

US 2012/0060686 A1    Mar. 15, 2012

Related U.S. Application Data

(60) Provisional application No. 61/420,978, filed on Dec. 8, 2010, provisional application No. 61/420,960, filed on Dec. 8, 2010, provisional application No. 61/421,048, filed on Dec. 8, 2010, provisional application No. 61/381,281, filed on Sep. 9, 2010, provisional application No. 61/381,294, filed on Sep. 9, 2010, provisional application No. 61/381,351, filed on Sep. 9, 2010.

(51) Int. Cl.
  *B01D 53/14*    (2006.01)
(52) U.S. Cl.
  USPC ............ 95/199; 95/223; 95/231; 95/236; 423/228

(58) Field of Classification Search
  USPC ........................................ 95/236
  See application file for complete search history.

(56) References Cited

U.S. PATENT DOCUMENTS

| 3,347,621 A | 10/1967 | Papadopoulos et al. |
| 3,794,586 A | 2/1974 | Kimura et al. |
| 4,100,257 A | 7/1978 | Sartori et al. |

(Continued)

FOREIGN PATENT DOCUMENTS

| CN | 1354036 | 6/2002 |
| CN | 101279181 | 10/2008 |

(Continued)

OTHER PUBLICATIONS

Pihko, Petri M. Hydrogen Bonding in Organic Synthesis. John Wiley & Sons. Sep. 2009. 5.3 N-H Hydrogen Bond Catalysts pp. 99.*

(Continued)

*Primary Examiner* — Duane Smith
*Assistant Examiner* — Joubert X Glover
(74) *Attorney, Agent, or Firm* — David M. Weisberg

(57) ABSTRACT

A $CO_2$ amine scrubbing process uses an absorbent mixture combination of an amine $CO_2$ sorbent in combination with a non-nucleophilic, relatively stronger, typically nitrogenous, base. The weaker base(s) are nucleophilic and have the ability to react directly with the $CO_2$ in the gas stream while the relatively stronger bases act as non-nucleophilic promoters for the reaction between the $CO_2$ and the weaker base. The sorption and desorption temperatures can be varied by selection of the amine/base combination, permitting effective sorption temperatures of 70 to 90° C., favorable to scrubbing flue gas.

27 Claims, 15 Drawing Sheets

(56) References Cited

U.S. PATENT DOCUMENTS

| | | | |
|---|---|---|---|
| 4,112,051 A | 9/1978 | Sartori et al. | |
| 4,410,335 A | 10/1983 | Childs | |
| 4,474,682 A | 10/1984 | Billenstein et al. | |
| 4,539,189 A * | 9/1985 | Starkston et al. | 423/220 |
| 4,624,838 A | 11/1986 | Pan et al. | |
| 4,636,323 A | 1/1987 | Nagai et al. | |
| 5,057,122 A | 10/1991 | Blain et al. | |
| 5,068,046 A | 11/1991 | Blain et al. | |
| 5,565,145 A | 10/1996 | Watson et al. | |
| 5,879,433 A | 3/1999 | Gallup et al. | |
| 6,075,000 A | 6/2000 | Rohrbaugh et al. | |
| 6,140,276 A | 10/2000 | Duncum et al. | |
| 6,579,343 B2 | 6/2003 | Brennecke et al. | |
| 6,586,106 B2 | 7/2003 | Shibuya et al. | |
| 6,908,497 B1 * | 6/2005 | Sirwardane | 95/136 |
| 2002/0189444 A1 | 12/2002 | Brennecke et al. | |
| 2004/0035293 A1 | 2/2004 | Davis, Jr. | |
| 2005/0129598 A1 | 6/2005 | Chinn et al. | |
| 2005/0183337 A1 | 8/2005 | Cadours et al. | |
| 2005/0239974 A1 | 10/2005 | Grimm et al. | |
| 2005/0257421 A1 | 11/2005 | Siggelkow et al. | |
| 2006/0188423 A1 | 8/2006 | Cadours et al. | |
| 2006/0251558 A1 | 11/2006 | Chinn et al. | |
| 2007/0286783 A1 | 12/2007 | Carrette et al. | |
| 2008/0004362 A1 | 1/2008 | Masuda et al. | |
| 2008/0025893 A1 * | 1/2008 | Asprion et al. | 423/228 |
| 2008/0050296 A1 | 2/2008 | Tontiwachwuthikul et al. | |
| 2008/0141858 A1 | 6/2008 | Liu et al. | |
| 2008/0187485 A1 | 8/2008 | Magne-Drisch et al. | |
| 2009/0136402 A1 | 5/2009 | Heldebrandt et al. | |
| 2009/0220397 A1 * | 9/2009 | Heldebrant et al. | 423/210 |
| 2009/0263302 A1 | 10/2009 | Hu | |
| 2009/0291874 A1 | 11/2009 | Bara et al. | |
| 2010/0288126 A1 | 11/2010 | Agar et al. | |
| 2011/0293498 A1 | 12/2011 | Lahary et al. | |

FOREIGN PATENT DOCUMENTS

| | | | | |
|---|---|---|---|---|
| DE | 3504538 | | 9/1985 | |
| DE | 102006036228 | * | 7/2008 | B01D 53/14 |
| DE | 102008007087 A1 | | 8/2009 | |
| DE | 102008013738 A1 | | 9/2009 | |
| EP | 0 349 787 B1 | | 8/1994 | |
| EP | 0692558 | | 1/1996 | |
| FR | 2918386 A1 | | 7/2007 | |
| GB | 1 473 103 A | | 5/1977 | |
| JP | 56145984 | | 11/1981 | |
| JP | 61225293 | | 10/1986 | |
| JP | EP0558019 A2 | * | 2/1993 | B01D 53/14 |
| JP | 2003193385 | | 7/2003 | |
| JP | 2005126279 | | 5/2005 | |
| JP | 2006150298 | | 6/2006 | |
| JP | 2007197503 | | 8/2007 | |
| WO | 2006103812 A1 | | 10/2006 | |
| WO | 2007/003618 A1 | | 1/2007 | |
| WO | 2008/007320 A3 | | 1/2008 | |
| WO | 2008/015217 A1 | | 2/2008 | |
| WO | 2008068411 A2 | | 6/2008 | |
| WO | 2008/094846 A1 | | 8/2008 | |
| WO | 2010089257 A1 | | 8/2010 | |

OTHER PUBLICATIONS

Dean, J.A. (1999). Lange's Handbook of Chemistry (15th Edition). McGraw-Hill. Table 8.8 pKa Values of Organic Materials in Water at 25° C.*

S. Dinda et al., "Kinetics of reactive absorption of carbon dioxide with solutions of aniline in carbon tetrachloride and chloroform", Chemical Engineering Journal, 136 (2008), 349-357.

M. Smiglak et al., "Ionic liquids via reaction of the zwitterionic 1,3-dimethylimidazolium-2-carboxylate with protic acids. Overcoming synthetic limitations and establishing new halide free protocols for the formation of ILs", Green Chemistry, 9 (2007), 90-98.

A.M. Voutchkova et al., "Imidazolium Carboxylates as Versatile and Selective N-Heterocyclic Carbene Transfer Agents: Synthesis, Mechanism, and Applications", J. Amer. Chem. Soc., 129 (2007), 12834-46.

I. Tommasi & F. Sorrentino, "Synthesis of 1,3-dialkylimidazolium-2-carboxylates by direct carboxylation of 1,3-dialkylimidazolium chlorides with CO2", Tetrahedron Letters, 47 (2006), 6453-6.

H.A. Duong et al., "Reversible carboxylation of N-heterocyclic carbenes", Chem. Commun., 2004, 112-3.

A. Tudose et al., "Imidazol(in)ium-2-carboxylates as N-heterocyclic carbene precursors in ruthenium-arene catalysts for olefin metathesis and cyclopropanation", J. Organomet. Chem., 691 (2006), 5356-65.

N.J. Bridges et al., "An Intermediate for the Clean Synthesis of Ionic Liquids: Isolation and Crystal Structure of 1,3-Dimethylimidazolium Hydrogen Carbonate Monohydrate", Chem. Eur., 13 (2007), 5207-12.

H. Zhou et al., "CO2 Adducts of N-Heterocyclic Carbenes: Thermal Stability and Catalytic Activity toward the Coupling of CO2 with Epoxides", J. Org. Chem., 73 (2008), 8039-44.

E. Sada et al., "Reaction Kinetics of Carbon Dioxide with Amines in Non-aqueous Solvents", Chemical Engineering Journal, 33 (1986), 87-95.

P.J. Carvalho et al., "Specific Solvation Interactions of CO2 on Acetate and Trifluoroacetate Imidazolium Based Ionic Liquids at High Pressures", J. Phys. Chem. B, 113 (2009), 6803-12.

C. Cadena et al., "Why is CO2 So Soluble in Imidazolium-Based Ionic Liquids?", J. Am. Chem. Soc., 126 (2004), 5300-8.

A. Yokozeki et al., "Physical and Chemical Absorptions of Carbon Dioxide in Room-Temperature Ionic Liquids", J. Phys. Chem. B, 112 (2008), 16654-63.

M.B. Shiflett et al., "Phase behavior of {carbon dioxide+[bmim][Ac]} mixtures", J. Chem. Thermo. 40 (2008), 25-31.

E.J. Maginn, "Design and Evaluation of Ionic Liquids as Novel CO2 Absorbents", University of Notre Dame Quarterly Technical Report, May 31, 2005, DOE Award No. DE-FG26-04NT42122.

Z.J. Dijkstra et al., "Formation of carbamic acid in organic solvents and in supercritical carbon dioxide", J. Supercritical Fluids, 41 (2007), 109-114.

K. Masuda et al., "Studies on the solvent dependence of the carbamic acid formation from omega-(1-naphthyl) alkylamines and carbon dioxide", Tetrahedron, 61 (2005), 213-229.

E.M. Hampe & D.M. Rudkevich, "Reversible covalent chemistry of CO2", Chem. Commun. (2002), 1450-51.

D.J. Heldebrant et al., "CO2-Binding Organic Liquids (CO2BOLs) for Acid Gas Capture", Pacific Northwest Laboratory.

P.G. Jessop et al., "Reversible nonpolar-to-polar solvent", Nature, v. 436, Aug. 25, 2005, p. 1102.

D.J. Heldebrant et al., "Organic liquid CO2 capture agents with high gravimetric CO2 capacity", Energy & Environmental Science, 1 (2008), 487-93.

L. Phan et al., "Switchable Solvents Consisting of Amidine/Alcohol or Guanidine/Alcohol Mixtures", Ind. Eng. Chem. Res., 47 (2008), 539-45.

E.M. Hampe & D.M. Rudkevich, "Exploring reversible reactions between CO2 and amines", Tetrahedron, 59 (2003), 9619-25.

Y. Kayaki et al., "Utilization of N,N-Dialkylcarbamic Acid Derived from Secondary Amines and Supercritical Carbon Dioxide: Stereoselective Synthesis of Z Alkenyl Carbamates with a CO2-Soluble Ruthenium-P(OC2H5)3 Catalyst", Chem. Asian J., 3 (2008), 1865-70.

E. Sada et al., "Chemical Kinetics of the Reaction of Carbon Dioxide with Ethanolamines in Nonaqueous Solvents", AiChE Journal, 31(8), Aug. 1985, 1297-1303.

D.J. Heldebrant et al., "CO2-binding organic liquids (CO2BOLs) for post-combustion CO2 capture", Energy Procedia, 1 (2009), 1187-95.

G.F. Versteeg et al., "On the Kinetics Between CO2 and Alkanolamines both in Aqueous and Non-Aqueous Solutions. An Overview", Chem. Eng. Comm., 144 (1996), 113-58.

G.F. Versteeg & W.P.M. Van Swaaij, "On the Kinetics Between CO2 and Alkanolamines Both in Aqueous and Non-Aqueous Solutions— I. Primary and Secondary Amines", Chemical Engineering Science, 43(3), 1988, 573-85.

(56) References Cited

OTHER PUBLICATIONS

R.A. Davis & O.C. Sandall, "Kinetics of the Reaction of Carbon Dioxide With Secondary Amines in Polyethylene Glycol", Chemical Engineering Science, 48(18), 1993, 3187-93.

J.E. Bara et al., "Gas Processing With Ionic Liquid-Amine Solvents", URS Corporation (Denver, Colorado), 2010.

M. Kim & J.-W. Park, "Reversible, solid state capture of carbon dioxide by hydroxylated amidines", Chem. Commun., 46 (2010), 2507-9.

E.J. Maginn et al., "Development of new post-combustion carbon dioxide capture solvents: Are ionic liquids the answer?", 235th ACS National Meeting, Apr. 6-10, 2008, Abstract.

S. Dinda et al., "Kinetics of Reactive Absorption of Carbon Dioxide and Solutions of Aniline in Nonaqueous Aprotic Solvents", Ind. Eng. Chem. Res., 45 (2006), 6632-9.

D. Camper et al., "Room-Temperature Ionic Liquid-Amine Solutions: Tunable Solvents for Efficient and Reversible Capture of CO2", Ind. Eng. Chem. Res., 47 (2008), 8496-8.

J.E. Bara et al., "Guide to CO2 Separations in Imidazolium-Based Room-Temperature Ionic Liquids", Ind. Eng. Chem. Res., 48 (2009), 2739-51.

J.A. Tossell, "Catching CO2 in a Bowl", Inorganic Chemistry, 48 (2009), 7105-10.

H. Zhou et al., "N-Heterocyclic Carbene Functionalized Polymer for Reversible Fixation—Release of CO2", Macromolecules, 42 (2009), 5419-21.

Y. Ito, "Formation of Carbamic Acids and Their Photochemistry", Kokagaku Kyokai, 33(3), 2002, 205-12. English Abstract only.

N. Imaishi et al., "Chemical absorption of carbon dioxide by non-aqueous solutions of cyclohexylamine", Kagaku Kogaku Robunshu, 7(3), 1981, 261-6. English Abstract only.

D. Wan et al., "Can Nonspecific Host-Guest Interaction lead to Highly Specific Encapsulation by a Supramolecular Nanocapsule?", Macromolecules, 42 (2009), 6448-56.

V.L. Yushko et al., "Effect of water content on the solubility of carbon dioxide in solutions of monoethanolamine in sulfolane", Voprosy Khimii i Khimicheskoi Tekhnologii, 30 (1973), 3-5. English Abstract only.

E. Sada et al., "Chemical Absorption of Carbon Dioxide into Ethanolamine Solutions of Polar Solvent", AIChE Journal, 32(2), Feb. 1986, 347-9.

K. Yogish "Absorption of CO2 in Some Hybrid Solvents", Can. J. Chem. Eng., 68 (1990), 511-2.

P.S. Kumar et al., "New absorption liquids for the removal of CO2 from dilute gas streams using membrane contactors", Chem. Eng. Sci., 57 (2002), 1639-51.

K. Takeshita & A. Kitamoto, "Relation between separation factor of carbon isotope and chemical reaction of carbon dioxide with amine in nonaqueous solvent", J. Chem. Eng. Japan, 22(5), 1989, 447-54. English Abstract only.

K. Takeshita & A. Kitamoto, "Chemical equilibria of absorption of carbon dioxide into nonaqueous solution of amine", J. Chem. Eng. Japan, 21(4), 1988, 411-7. English Abstract only.

G.F. Versteeg & W.P.M. Van Swaaij, "On the Kinetics Between CO2 and Alkanolamines Both in Aqueous and Non-Aqueous Solutions—II. Tertiary Amines", Chemical Engineering Science, 43(3), 1988, 587-91.

O.R. Rivas, "Solvent selectivity for the purification of natural gases", Ph.D. Thesis, U.C. Berkeley, 1978, Abstract.

S. Xu et al., "Kinetics of the Reaction of Carbon Dioxide with 2-Amino-2-methyl-1-propanol Solutions", Chem. Eng. Sci., 51(6), 1996, 841-50.

R.J. Littell et al., "Physical absorption into non-aqueous solutions in a stirred cell reactor", Chem. Eng. Sci., 46(12), 1991, 3308-13.

I.L. Leites et al., "Removal of carbon dioxide from gas by solutions of monoethanolamine in various diluents", Khimicheskaya Promyshlennost, 8 (1975), 599-602. English Abstract only.

K. Takeshita et al., "Separation of carbon isotopes by using the chemical reaction of carbon dioxide with amines in nonaqueous solution", Kagaku Kogaku, 55(6), 1991, 426-8. English Abstract only.

Y. Liang et al., "Unimolecular Micelle Derived from hyperbranched Polyethyleneimine with Well-Defined Hybrid Shell of Poly(ethylene oxide) and Polystyrene: a Versatile Nanocapsule", J. Polym. Sci., Pt. A: Polym. Chem., 48 (2010), 681-91.

E.D. Bates et al., "CO2 Capture by a Task-Specific Ionic Liquid", J. Am. Chem. Soc., 124(6), 2002, 926ff.

J.D. Holbrey et al., "1,3-Dimethylimidazolium-2-carboxylate: the unexpected synthesis of an ionic liquid precursor and carbene-CO2 adduct", Chem. Commun., 2003, 28-29.

F. Karadas et al., "Review on the Use of Ionic Liquids (ILs) as Alternative Fluids for CO2 Capture and Natural Gas Sweetening", Energy Fuels, 24 (2010), 5817-28.

W.D. McGhee et al., "Palladium-Catalyzed Generation of O-Allylic Urethanes and Carbonates from Amines/Alcohols, Carbon Dioxide, and Allylic Chlorides", Organometallics, 12 (1993), 1429-33.

T. Yamada et al., "Reversible, Room-Temperature Ionic Liquids. Amidinium Carbamates Dervied from Amidines and Aliphatic Primary Amines with Carbon Dioxide", Chem. Mater., 19 (2007), 967-9.

T. Yamada et al., "Reversible, Room-Temperature Chiral Ionic Liquids. Amidinium Carbamates Dervied from Amidines and Amino-Acid Esters with Carbon Dioxide", Chem. Mater., 19 (2007), 4761-8.

T. Yu et al., "Carbon Dioxide and Molecular Nitrogen as Switches between Ionic and Uncharged Room-Temperature Liquids Comprised of Amidines and Chiral Amino Alcohols", Chem Mater., 20 (2008), 5337-44.

E.R. Perez et al., "Activation of Carbon Dioxide by Bicyclic Amidines", J. Org. Chem., 69 (2004), 8005-11.

A.R. Katritzky et al., "The N-Carboxylic Acids of Nitrogen Heterocycles", Heterocycles, 26 (1987), 1333-44.

\* cited by examiner

Ranges of pKa's for selected amine/non-nucleophilic base pairs (top) and pKa relationship to amine/base function (bottom) for Examples 1-6

CO₂ molar uptake and desorption for the aniline/TMG mixed amine/non-nucleophilic base system $CO_2$ absorption/desorption profile of aniline/TMG mixed amine/non-nucleohpilic base system at room temperature CO$_2$ molar uptake and desorption for the 3,3-iminodipropionitrile/TMG mixed amine/non-nucleophilic base system $CO_2$ molar uptake and desorption for the 1,5-bis(methylamino)-3-oxapentane/TMG mixed amine/non-nucleophilic base system $CO_2$ molar uptake and desorption for the piperidine/TMG mixed amine/non-nucleophilic base system Schematic structures of (A) amine-rich PEI, and (B) cyclohexyl alcohol-functionalized PEI (PEI-CHO) produced by epoxylation with cyclohexene oxide.

General concept of CO₂ reaction with multiamine molecules in strongly basic amine solvent Vapor-Liquid Equilibrium of EEA/TMG with $CO_2$ (Example 13).

MIXED AMINE AND NON-NUCLEOPHILIC BASE CO2 SCRUBBING PROCESS FOR IMPROVED ADSORPTION AT INCREASED TEMPERATURES

CROSS REFERENCE TO RELATED APPLICATIONS

This application claims the benefit of U.S. Provisional Application Nos. 61/420,978 filed Dec. 8, 2010, 61/420,960 filed Dec. 8, 2010, 61/421,048 filed Dec. 8, 2010, 61/381,281 filed Sep. 9, 2010, 61/381,294 filed Sep. 9, 2010, 61/381,351 filed Sep. 9, 2010, the entire contents of each of which are hereby incorporated by reference herein.

FIELD OF THE INVENTION

This invention relates to the removal of carbon dioxide and other acid gases from a gaseous stream containing one or more of these gases. In particular, the invention relates to a method for separating an acid gas, e.g., carbon dioxide, from a gas mixture using basic amine(s) in the presence of a stronger non-nucleophilic base as the sorbent.

BACKGROUND OF THE INVENTION

The removal of carbon dioxide from mixed gas streams is of great industrial importance and commercial value. Carbon dioxide is a ubiquitous and inescapable by-product of the combustion of hydrocarbons, and there is growing concern over its accumulation in the atmosphere and its potential role in a perceived global climate change. Laws and regulations driven by environmental factors may therefore soon be expected to require its capture and sequestration. While existing methods of $CO_2$ capture have been adequately satisfactory for the scale in which they have so far been used, future uses on the far larger scale required for significant reductions in atmospheric $CO_2$ emissions from major stationary combustion sources such as power stations fired by fossil fuels makes it necessary to improve the processes used for the removal of $CO_2$ from gas mixtures. According to data developed by the Intergovernmental Panel on Climate Change, power generation produces approximately 78% of world emissions of $CO_2$ with other industries such as cement production (7%), refineries (6%), iron and steel manufacture (5%), petrochemicals (3%), oil and gas processing (0.4%) and the biomass industry (bioethanol and bioenergy) (1%) making up the bulk of the total, illustrating the very large differences in scale between power generation on the one hand and all other uses on the other. To this must be added the individual problem of the sheer volumes of gas which will need to be treated: flue gases consist mainly of nitrogen from combustion air, with the $CO_2$, nitrogen oxides and other emissions such as sulfur oxides making up relatively smaller proportions of the gases which require treatment: typically, the flue gases from fossil fuel power stations typically contain from about 7 to 15 volume percent of $CO_2$, depending on the fuel, with natural gas giving the lowest amounts and hard coals the greatest.

Cyclic $CO_2$ absorption technologies such as Pressure Swing Absorption (PSA) and Temperature Swing Absorption (TSA) using liquid absorbents are well-established. The absorbents mostly used include liquid solvents, as in amine scrubbing processes, although solid sorbents are also used in PSA and TSA processes. Liquid amine absorbents, including alkanolamines, dissolved in water are probably the most common absorbents Amine scrubbing is based on the chemical reaction of $CO_2$ with amines to generate carbonate/bicarbonate and carbamate salts: the aqueous amine solutions chemically trap the $CO_2$ via formation of one or more ammonium salts (carbamate/bicarbonate/carbonate) which are thermally unstable, enabling the regeneration of the free amine at moderately elevated temperatures. Commercially, amine scrubbing typically involves contacting the $CO_2$ and/or $H_2S$ containing gas stream with an aqueous solution of one or more simple amines (e.g., monoethanolamine (MEA), diethanolamine (DEA), methyldiethanolamine (MDEA) or triethanolamine (TEA)). The low molecular weight of MEA makes it economically attractive because sorption takes place on a molecular basis while the amine is sold on a weight basis. The cyclic sorption process requires high rates of gas-liquid exchange, the transfer of large liquid inventories between the absorption and regeneration steps, and high energy requirements for the regeneration of amine solutions. It is challenged by the corrosive nature of the amine solutions containing the sorbed $CO_2$. Without further improvement, these difficulties would limit the economic viability of the aqueous amine scrubbing processes in very large scale applications.

The cyclic absorption processes using aqueous sorbents require a large temperature differential in the gas stream between the absorption and desorption (regeneration) parts of the cycle. In conventional aqueous amine scrubbing methods relatively low temperatures, e.g., less than 50° C., are required for $CO_2$ uptake with an increase to a temperature to above about 100° C., e.g., 120° C., required for the desorption. The heat required to maintain the thermal differential is a major factor in the cost of the process, and with the need to regenerate the solution at temperatures above 100° C., the high latent heat of vaporization of the water (2260 kJ/Kg at 100° C.) obviously makes a significant contribution to the total energy consumption. In addition, the low molecular weight amines commonly used in the liquid process suffer significant amine loss due to vaporization in the temperature swing process. If $CO_2$ capture is to be conducted on the larger scale appropriate to use in power stations, more effective and economical separation techniques need to be developed.

Another area where more efficient $CO_2$ separation processes are used is in enhanced oil recovery (EOR) where $CO_2$ is re-injected into the gas or liquid hydrocarbon deposits to maintain reservoir pressure. With the advanced age of many producing reservoirs worldwide and the ever-increasing challenge of meeting demand, the expanding use of EOR methods is becoming more widespread. Typically the source of carbon dioxide for EOR is the producing hydrocarbon stream itself, which may contain anywhere from less than 5% to more than 80% of $CO_2$. Other options are to capture $CO_2$ from the flue gases of various combustion sources and pre-combustion capture of $CO_2$ from shifted syngas produced in fuel gasification processes.

Various commercial $CO_2$ capture processes have been brought to market. The Fluor Daniel Econamine™ Process (originally developed by Dow Chemical and Union Carbide), which uses MEA for recovery of $CO_2$ from flue gases, primarily for EOR applications, has a number of operational plants. The Benfield™ Process using hot potassium carbonate is used in many ammonia, hydrogen, ethylene oxide and natural gas plants with over 675 units worldwide licensed by UOP and has been proposed for treating flue gas, notwithstanding its minimum $CO_2$ partial pressure requirement of 210-345 kPag (30-50 psig). One significant disadvantage of the Benfield Process is its use of a high temperature stripping step (175° C.) approximately 75-100° C. above the temperature of the absorption step. The Catacarb™ process, also using hot potassium carbonate, also uses high temperature stripping resulting in high energy consumption.

Processes using sterically hindered amines as alternatives to MEA, DEA, and TEA have also achieved success, including the ExxonMobil Flexsorb™ Process and the KS™ Process from Mitsubishi Heavy Industries and Kansai Electric Power Co.

Processes using solid absorbents are also known, and, while they may avoid many of the limitations of amine scrubbing, solid chemical sorbents are generally challenged by poor mass and heat transfer properties, whereas solid physical sorbents suffer from a lack of sufficiently selective $CO_2$ absorption under the humid conditions present in most commercial combustion flue gas processes.

One of the problems in dealing with $CO_2$ capture from flue gas has been that flue gas is at a relatively low pressure, approximately atmospheric or only slightly above, and sorption into a liquid scrubbing medium is generally facilitated by the use of higher pressures. Another problem is that flue gas—and possibly other gas streams—may be at temperatures above ambient where sorption is again less favorable. It would therefore be desirable to develop a $CO_2$ scrubbing process exhibiting good sorption at relatively higher temperatures.

SUMMARY OF THE INVENTION

We have now found that it is possible to adjust the temperature and pressure stability of the $CO_2$/amine reaction products formed in the amine gas scrubbing process by the use of a second base functionality in addition to the amine(s) present in the sorbent. In this way, $CO_2$ absorption and regeneration ($CO_2$ desorption) conditions, especially temperature, can be optimized by tailoring absorbent structure and reaction product properties to each specific application; significant reductions in process operating costs for carbon capture may be achieved. An additional advantage of this approach can be that selective $CO_2$ capture from wet $CO_2$-containing streams such as flue gas or wet natural gas may be achieved. An additional or alternate advantage of this approach can be the ability to avoid substantial viscosity increase and/or phase separation at very high amine concentrations in the liquid process.

According to the present invention, a $CO_2$ amine scrubbing process can use a combination of an amine $CO_2$ sorbent with a second, non-nucleophilic base which is more strongly basic, in terms of $pK_a$, than the amine sorbent(s). The weaker amine base(s) are nucleophilic and have the ability to react directly with the $CO_2$ in the gas stream, while the relatively stronger, typically nitrogenous bases can act as non-nucleophilic proton-acceptors for the reaction between the $CO_2$ and the weaker base to form a more stable ammonium carbamate reaction product, in which moieties from both bases can be present. The mixed base (amine plus second base functionality) can have the capability to sorb $CO_2$ effectively at temperatures above about 50° C. and even as high as about 90° C. although a maximum of about 70° C. can be preferred.

The process can possess exceptional utility in removing $CO_2$ from flue gas streams as well as other gas streams at temperatures above ambient (above ~30° C.), since the necessity for cooling the stream is then reduced. The mixed bases may be used in aqueous or non-aqueous medium, and this may confer other significant advantages including the potential for increasing the $CO_2$:amine capture ratio.

DETAILED DESCRIPTION OF THE EMBODIMENTS

The method of this disclosure involves removing $CO_2$ and/or other acid gases, such as $H_2S$, from a gas stream containing one or more of these gases using a sorbent medium comprising a combination of at least two bases of differing relative basicities. One basic component can comprise one or more relatively weak amines (and/or polyamines), and the second basic component can comprise one or more relatively stronger, non-nucleophilic nitrogenous bases. The stronger base component may itself be effective to sorb $CO_2$, and it can therefore be regarded as a co-sorbent and/or as a promoter for the amine component. One way of carrying out the sorption process can be to operate with a liquid sorption medium comprising the amine and the secondary base with or without a solvent. In this variant, the process can be generally carried out in a sorption zone, typically a sorption tower in a cyclically operating unit, under absorption conditions (i.e., temperature and/or pressure) favorable for absorbing a component of the gas mixture and for producing an absorption effluent having a reduced concentration of the absorbed component relative to the gas mixture Subsequently, the sorbed component can then be desorbed from the liquid sorbent, suitably by decreasing the pressure and/or by stripping with a non-reactive gas, e.g., a natural gas stream, in a regeneration tower under conditions favoring release of the sorbed acid gas, normally increased temperature or decreased pressure. Under the selected desorption conditions, the sorbed component can be purged from the selective absorbent and recovered.

Cyclic Sorption Unit

Figure 1:
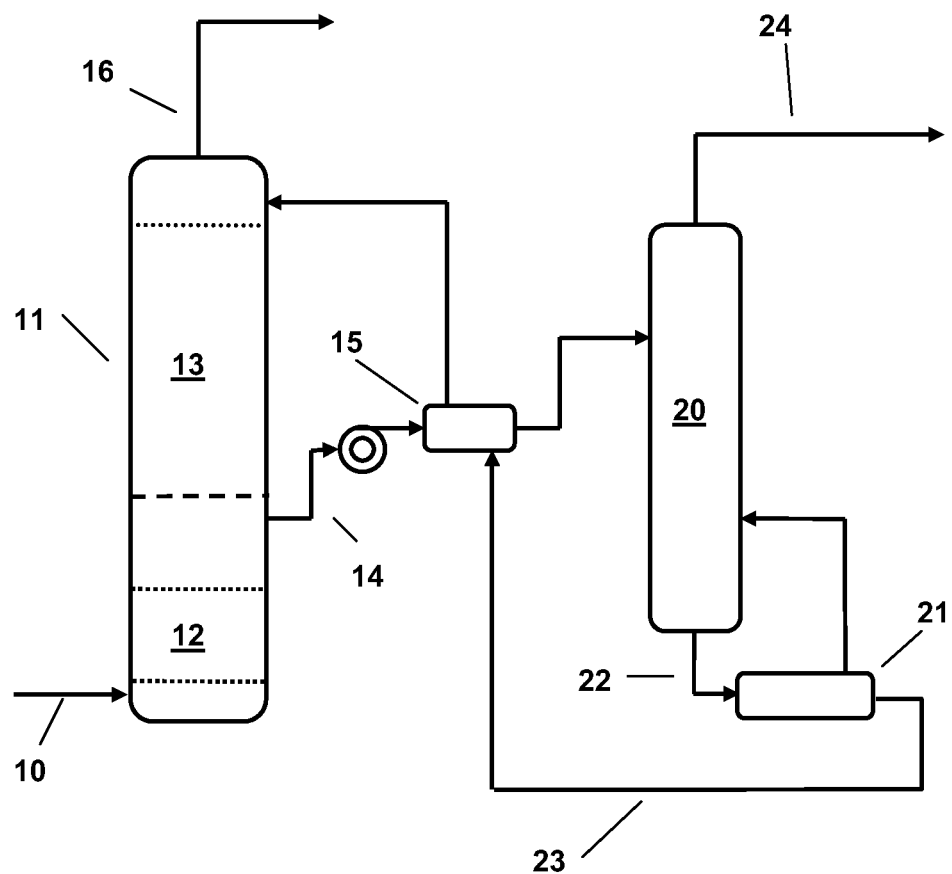
FIG. 1 is a simplified schematic of a cyclic separation unit suitable for separating $CO_2$ from a flue gas stream.

FIG. 1 shows a representative simplified schematic of a continuous cyclic gas separation unit which may be used for separating $CO_2$ from flue gas streams, natural gas streams, and other streams using the present non-aqueous solvent amine absorbent solutions. The hot flue gas stream can enter the unit by way of line 10, entering near the bottom of absorber tower 11 and preferably passing through a cooling section 12, in which its temperature can be reduced by direct or indirect cooling to bring it to a suitable temperature for the sorption step which follows. Such cooling may additionally or alternately be effective to reduce the water content of the stream, if desired. The present mixed base sorbent process can, however, be capable of operation at relatively high sorption temperatures with gas streams containing relatively high water contents and for this reason, the cooling step may be omitted with the gas passing directly into sorption section 13. In an alternate embodiment, the cooling of the hot flue gas stream can be achieved prior to the stream entering the absorber tower 11.

From here, the gas stream can pass into sorption section 13 in countercurrent contact with a descending stream of the liquid sorbent medium. At least part of the $CO_2$, along with other gases which are amenable to absorption in the solution, can be absorbed into the sorbent medium resulting in a "rich" solution 14 containing the sorbed $CO_2$ which can be removed with a separation tray (not shown) near the lower end of the sorption section. The rich solution can then pass through heat exchanger 15 to desorption/regeneration tower 20 in which the $CO_2$ and other gases can be desorbed, in this case, by an increase in temperature, decrease in pressure, and/or the use of a purge (stripping gas). The rich solution can enter the tower at a level appropriate to its composition and can pass downwards as dissolved gases are removed. Heat for the regeneration tower can be supplied by reboiler 21 which can circulate a slipstream of solution taken from near the bottom of the regeneration tower by way of line 22. A stream of regenerated lean solution with a lower content of $CO_2$ can be taken from the reboiler in line 23 to pass through the other side of heat exchanger 15 before re-entering absorber tower 11 for passage through the gas stream. A gas stream of decreased $CO_2$ content can pass out of absorber tower 11 through line 16, and the desorbed $CO_2$ and other acid gases removed from the original gas stream can be removed in concentrated form through line 24 and taken to final sequestration or utilization (e.g., in industrial gas and/or in enhanced oil recovery processes).

Conventional equipment can be used to perform the various functions of the cyclic scrubbing process, such as monitoring and automatically regulating the flow of gases so that it can be fully automated to run continuously in an efficient manner.

Gas Stream

The gas streams particularly amenable to treatment by the present sorption process can include flue gas from the combustion of carbonaceous fuels and/or natural gas from subterranean and other sources. Flue gas may originate from the combustion of carbon-containing fossil fuels such as natural gas, oils, and/or lignite, as well as sub-bituminous, bituminous, and/or anthracite coals. Its $CO_2$ content may typically vary from about 6 to about 15 weight percent, depending on the fuel, with the highest levels coming from hard coal combustion and the lowest from natural gas. Natural gas streams containing carbon dioxide may contain, in addition to methane and carbon dioxide, one or more other gases such as ethane, n-butane, i-butane, hydrogen, carbon monoxide, ethene, ethyne, propene, nitrogen, oxygen, helium, neon, argon, krypton, hydrogen sulfide, and carbonyl sulfide, as well as, in some cases, mercury and/or other metal contaminants, if they have not been removed by other pre-treatment. Other streams that can be treated by the present separation process can include syngas and shifted syngas produced in fuel gasification processes and gas streams from petrochemical plants whose composition can naturally depend on the process from which they are derived.

The amount of carbon dioxide in the gas mixture can typically vary from about at least 1 percent upwards; in many streams, it can be at least 10 percent and may even be higher, as with some gas streams from natural gas fields such as the LaBarge (Wyo.) field, where the gas is about 66.5 percent carbon dioxide, about 20.5 percent methane, about 7.4 percent nitrogen, about 5.0 percent hydrogen sulfide, and about 0.6 percent helium.

Water is likely to be present both in flue gases and in natural gas from combustion of hydrocarbon fuels or from contact with ground waters. Although the present process can accept water in the entering gas stream, removal of substantial quantities may be desirable. In such situations, the gas stream may optionally also be subjected to dehumidification prior to contacting with the absorbent materials and processes described herein. The dehumidification can be carried out by conventional methods by the use of a drying agent/absorber guard bed upstream of the acid gas scrubbing unit, and/or by carrying out the $CO_2$ absorption at temperatures above 100° C. using an absorbent capable of being regenerated above the absorption temperature. For example, the dehumidification can be carried out by absorption over solid sorbents such as salt dryers, molecular sieves, silica gels, and/or aluminas.

Absorption Process

In the design of a practical $CO_2$ capture process, a number of issues need to be considered, including:

The efficiency of the capture process in terms of relative amount of absorbent required;

The efficiency of the capture process in terms of energy required for absorption/desorption; and Corrosion factors.

These issues are, of course, directly affected by the chemistry of the sorption/desorption processes. It is believed that the carbon atom of $CO_2$ is electron-deficient, making it susceptible to nucleophilic attack. In aqueous amine solution, the relative nucleophilicity of the amine and water can determine the reactive pathway. Nucleophilic addition can create a zwitterionic transition state, which can undergo an intramolecular proton transfer to a neutral acid. If water is the acting nucleophile, carbonic acid typically results; with an amine as the acting nucleophile, carbamic acid is generally formed. Subsequent reaction with a Bronsted base amine can lead to either an ammonium bicarbonate or an ammonium carbamate, respectively. Primary and secondary amines can exhibit both Lewis and Bronsted basicities in this scheme. Tertiary amines lack a proton for intramolecular transfer to form the acid intermediate, and therefore only exhibit Bronsted basicity in this chemistry. Further reaction of the carbamate with water may lead to a final bicarbonate product with a 1:1 $CO_2$:amine ($CO_2$:non-tertiary amine) ratio, or to a carbonate product with a 1:2 $CO_2$:amine ($CO_2$:non-tertiary amine) ratio (depending on solution pH). The conventional aqueous process is based on trying to control adsorption/desorption conditions to enhance fast carbamate formation while minimizing the formation of bicarbonates.

In non-aqueous systems, a zwitterion can form by nucleophilic attack of the lone pair of electrons on the nitrogen of the amine onto the carbon of the $CO_2$. Again, the zwitterion is usually unstable and can rapidly rearrange via proton transfer to the corresponding carbamic acid. Both the zwitterions and the carbamic acids can generally be unstable, and it is not known which equilibrium form undergoes further reaction, although it is posited that the $CO_2$ carbamic acid may be deprotonated by a second equivalent of free amine to produce an ammonium carbamate salt with the overall stoichiometric requirement of two moles of amine per one mole of carbon dioxide absorbed (0.5:1 $CO_2$:non-tertiary amine). This pathway can also be found in aqueous systems at early reaction stages, although there may be a different carbamate-carbamic acid equilibrium in non-aqueous systems, and, in the aqueous systems, there exists the possibility of further reaction with water to form bicarbonate and carbonate.

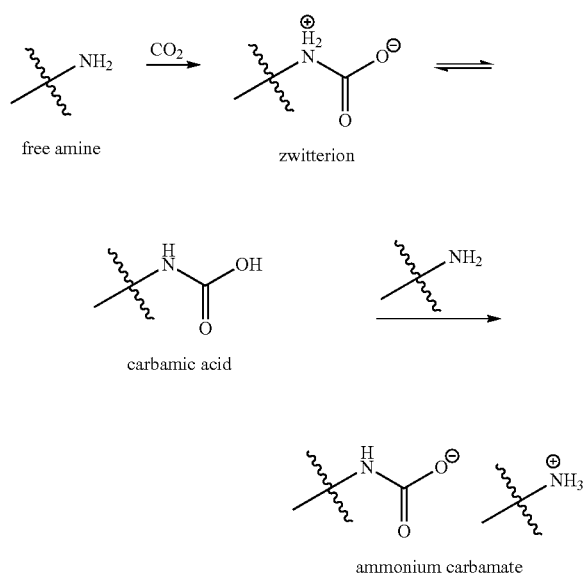

This chemistry requires the amine to function as both an effective nucleophile (Lewis base) in its attack on the $CO_2$ and a proton acceptor (Bronsted base) in its reaction with the carbamic acid. These two types of basicity are, however, different, in that Lewis acid-base reactions involve electron transfer, while Bronsted acid-base reactions involve proton transfer. A strong Bronsted base may not necessarily be a strong Lewis base, and vice versa. Both the internal proton transfer to form the carbamic acid and the subsequent acid-base reaction to form the carbamate product would be expected to be rapid. The initial nucleophilic addition of the amine nitrogen and $CO_2$ carbon can therefore be considered the rate-determining step in the formation of ammonium carbamate.

The stability of the carbamate salt can be, in part, a reflection of the N—COO⁻ covalent bond strength formed by electron donation from the nucleophilic nitrogen into the lowest unoccupied molecular orbital of $CO_2$ localized on the electron-deficient carbon. The relative stability of the N—COO⁻ bond can depend on the N—C bond distance and/or the resulting degree of orbital overlap, the relative energy of unoccupied π orbitals that may provide resonance stabilization resulting from the delocalization of double bond character into this bond, and the presence of steric effects that may impact one or both of these factors. In addition, the ability of the proton acceptor to form a stable protonated cation can play a major role in determining the overall stability of the ammonium carbamate product. Overall, more strongly nucleophilic amines can more readily attack $CO_2$ to form a zwitterion transition state that can subsequently relax, both structurally and electronically, to the thermodynamically favored carbamate, but this kinetic propensity does not necessarily relate directly to the stability of the end product.

Since the reaction sequence posited above requires two types of amine basicity, the use of the second base in addition to the amine can provide the ability to fine-tune nucleophilicity and Bronsted basicity independently and can help improve or optimize the overall reaction kinetics and thermodynamics. In the presence of a strong Bronsted base, a strongly nucleophilic amine can tend to provide rapid overall kinetics and enhanced carbamate product stability, although it should be noted that producing a more stable carbamate may increase the regeneration energy requirement in a reversible $CO_2$ absorption/desorption process.

By suitable choice of the mixed bases, the thermodynamics and kinetics of the sorption and desorption reactions can be varied so that the sorption can be carried out at a relatively high temperature favorable to the treatment of gas streams, such as typical of flue gases. Operation of the sorption step at temperatures of at least about 50° C. (about 122° F.), e.g., at least about 70° C. (about 158° F.) or at least about 90° C. (about 194° F.), could then become feasible. Desorption may be carried out by stripping with a non-reactive gas such as nitrogen and/or natural gas, by reduction of the pressure above the sorbent solution, and/or by increase in temperature. If stripping with a non-reactive gas such as nitrogen is employed, the $CO_2$ may typically be desorbed at temperatures not more than about 10° C. (about 18° F.), e.g., not more than about 20° C. (about 36° F.), higher—in certain cases, it may even carried out substantially isothermally. With sorption temperatures above about 50° C., the $CO_2$ may be effectively desorbed by raising the temperature of the solution containing the sorbed $CO_2$ to about 70° C. or higher, for example, and, if the gas stream entering the process contains significant amounts of water, the desorption temperature may be raised to about 100° C. (about 212° F.) or higher, for example, to desorb water which enters the sorbent solution; the desorption temperature need not, however, be higher than about 120° C. (about 248° F.), since the $CO_2$ can typically be desorbed with a minimal temperature increase, and, as long as ~100° C. or thereabouts is attained, any sorbed water should typically be effectively driven out of the sorbent solution, fitting it to be recycled to the regeneration step after cooling to the correct sorption temperature.

Using mixed base pairs comprising a strong nucleophile combined with a strong (Bronsted) base (non-nucleophilic, normally nitrogenous base), a mixed ammonium carbamate salt can be formed in which the nucleophilic amine nitrogen can form the covalent bond with $CO_2$, while the second base can accept the proton from the nucleophilic amine to form the ammonium counter-cation, as shown below.

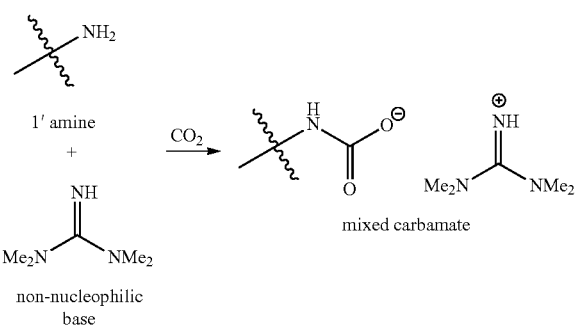

While primary and secondary amines can form the carbamic acid/carbamate species in both aqueous and non-aqueous systems, tertiary amines are typically unable to do so in non-aqueous systems, lacking the necessary proton for the transformation of the zwitterion to the carbamic acid. They can therefore generally be unable to form a stable product with $CO_2$ in non-aqueous solution. They can, however, be capable of functioning as a proton-accepting species, e.g., as the non-nucleophilic Bronsted base component of the mixed base system, in the presence of more weakly basic nucleophilic species in non-aqueous solution, as shown below.

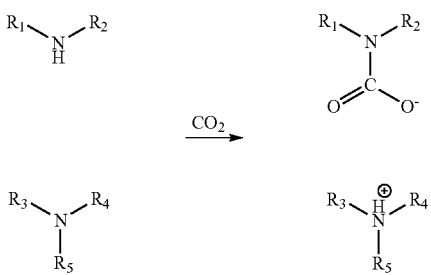

In the presence of water, hydration may lead to the formation of ammonium carbonate and/or bicarbonate species with $CO_2$ via hydrolysis of the carbamate, or the direct addition of water to $CO_2$ plus proton transfer; tertiary amines, functioning as Bronsted bases, may also form bicarbonate as a stable product by reaction with water and $CO_2$. The aqueous $CO_2$ reaction to form bicarbonate with either kind of base (tertiary amine or Lewis base) is typically slower than carbamate formation and can be inhibited, e.g., by selecting the appropriate pair of bases to generate a very stable mixed carbamate and so increase the selectivity of $CO_2$ absorption by the bases over other reactive compounds, primarily water. Thus, by use of a suitable mixed base pair, the potential exists for selectively reacting $CO_2$ in an aqueous solution and/or from a wet gas source, eliminating the need to dry the gas in order to achieve carbamate-only reaction chemistry.

Regardless of the specific product formed, the above chemistry can function to convert substantially neutral molecules into ion pairs. Therefore, at relatively high concentrations of amines (and/or in polyamines having a relatively high density of amines), reaction with $CO_2$ can generate a relatively high charge density. In nonpolar solvents, the strong electrostatic attractions and repulsions can result in agglomeration, tending to lead to higher viscosity and/or phase separation. As viscosity increases, the rate of $CO_2$ adsorption can become increasingly mass-transfer-limited, and liquid handling can become increasingly problematic. These factors, as well as enhanced corrosivity, can place practical limits on the maximum/desirable amine concentrations that can be employed in the liquid phase process.

Weak Bases

The sorbent medium can contain one or more nucleophilic, relatively weakly basic amines, i.e., amines having a potentially nucleophilic nitrogen. The weakly basic nucleophilic amines can include primary and/or secondary amine moieties capable of participating in the initial formation of the zwitterion by nucleophilic attack onto the carbon of the $CO_2$ (and its subsequent transformation into the carbamic acid). These amines can advantageously have a $pK_a$ (acid dissociation equilibrium constant) of not more than about 12, although, in most cases, the $pK_a$ of the amine can typically be not greater than about 10.5, or not greater than about 10, with an upper limit of 10 representing the majority of useful nucleophilic amines ($pK_a$ as measured/predicted at 25° C. in aqueous solution and/or as measured in other solvent and converted to an aqueous value, referred to as aqueous equivalent scale). Most of the useful amines can have a $pK_a$ in the range of 4 to 10, in many cases from 5 to 8 or 5 to 9, although values below 5 may be potentially useful where low temperature regeneration is desired. Secondary amines, especially those in the preferred $pK_a$ range, may be used. Monoamines, diamines, and polyamines may be used, although, as noted below, diamines and polyamines may require the use of additional solvent to obviate the formation of high viscosity products in the presence of the $CO_2$. The nucleophilic amines may be aliphatic, cycloaliphatic, or aromatic. Substituted and unsubstituted alkyl amines may be used with substituent groups such as alkyl (usually lower $C_1$-$C_6$ alkyl), hydroxyalkyl (usually lower $C_1$-$C_6$ hydroxyalkyl), hydroxyl, alkoxy (usually lower $C_1$-$C_6$ alkoxy), aryl, and nitrile, being the most common Aryl substituents are preferably not present but, if present at all, should typically be positioned no closer than the beta carbon of the alkyl chain in order to maintain the aliphatic character of the amine by precluding delocalization of the lone pair on the amine nitrogen into the aromatic ring system. On the other hand, the presence of polar and/or electronegative substituents, such as nitrile, hydroxyl, etc., and/or of electronegative atoms and groups, especially oxygen, in the backbone chain of the amine, as in the etheramines, is believed to be favorable for interaction with the solvent, e.g., so as to avoid the formation of precipitates in otherwise soluble systems. Oxygen and other linking species may be in the chain, such as in 2-ethoxyethylamine (2EEA or EEA).

Amines which may be used as the less basic (nucleophilic) amine can include aromatic amines (such as aniline), cycloaliphatic amines (such as piperazine and/or piperidine), alkanolamines (such as monoethanolamine (MEA), diethanolamine (DEA), 2-amino-2-methyl-1-propanol (AMP), 2-(2-aminoethylamino)ethanol (AEE), 1,5-diamino-3-oxapentane (DAOP), 1,5-bis(methylamino)-3-oxapentane (BMAP), 2-amino-2-hydroxymethyl-1,3-propanediol (Tris), and/or diisopropanolamine (DIPA)), or the like, or combinations thereof. Additionally or alternately, other potentially useful amines in this role can include, for example, diglycolamine (DGA), 2-n-propoxyethylamine, bis(2-methoxyethyl)amine, bis(2-ethoxyethyl)amine, 3-aminopropionitrile, 3,3'-iminodipropionitrile, aminoacetonitrile, and/or hydroxyethyl-ethylenediamine (HEEDA). Although some amines such as isopropylamine ($pK_a$ 10.7) are relatively basic, they may perform in the role of the weakly basic amine when used in combination with a base such as 1,1,3,3-tetramethylguanidine (TMG, predicted $pK_a$ ~15.2) which is relatively more basic. Tertiary amines alone are typically not used for this component of the sorbent, in view of their substantial inability to engage in the nucleophilic reaction with the $CO_2$ to proceed to the carbamic acid in the absence of water.

Figure 8:
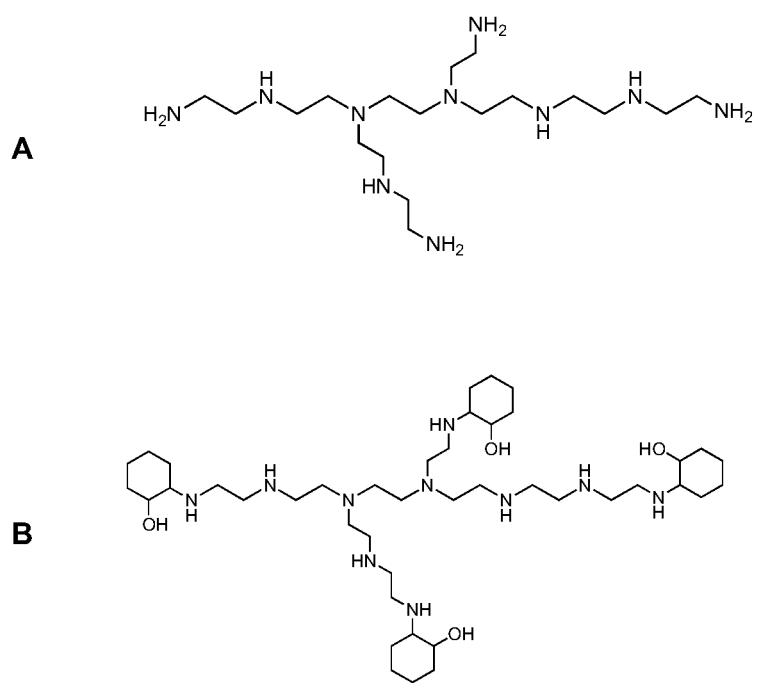
FIG. 8 shows schematic structures of (A) amine-rich polyethylenimine (PEI), and (B) cyclohexyl hydroxy-functionalized PEI (PEI-CHO) produced by epoxylation of PEI with cyclohexene oxide.

The role of the weakly basic amine can additionally or alternately be provided by a polyamine. One such class of polyamines can include polyalkyleneimines (such as shown in FIG. 8A) that are linear, cyclic, and/or branched (including dendritic/hyperbranched), and that contain one or more secondary amines, optionally one or more primary amines, and optionally one or more tertiary amines. Due to structural and/or electronic differences, these polyamines would be expected to have a range of base strengths. It should be readily apparent that the potential of generating a relatively high charge density by extensive reaction with $CO_2$ could result in the formation of a dense network of such molecules, when used in combination with a more strongly basic, non-nucleophilic amine.

Non-limiting examples of such polyalkyleneimines can have a general repeat unit structure of $—[(CH_2)_x—NR]_y—$, where x is from 2 to 6, where y is from 4 to 50, and where each R is hydrogen (representing the situation where the backbone nitrogen is a secondary amine), an alkyleneamine branch having the structure $—(CH_2)_x—NH_2$ (representing the situation where the backbone nitrogen is a tertiary amine and where the resulting branch nitrogen is a primary amine), or an alkyleneimine branch having the structure $—(CH_2)_x—NR'_2$, where a first R' is an alkyleneamine branch or another alkyleneimine branch and a second R' is hydrogen (representing the situation where the backbone nitrogen is a tertiary amine and where the resulting branch nitrogen is a secondary amine), another alkyleneimine branch (representing the situation where the backbone nitrogen is a tertiary amine and where the resulting branch nitrogen is a tertiary amine, with the further branch nitrogen being a secondary or tertiary amine), or yet another alkyleneamine branch (also representing the situation where the backbone nitrogen is a tertiary amine and where the resulting branch nitrogen is a tertiary amine, with the further branch nitrogen being a primary amine). It should be understood herein that the subscript "y" represents the average number of repeat units in a linear polyalkyleneimine chain and thus is only meaningful as an average number; it is contemplated that the distribution of polymeric/oligomeric polyalkyleneimines can reflect some proportion of chains having higher or lower backbone/linear repeat units without significantly departing from the scope of the recited "y" range(s) herein. Polyalkyleneimine polymers/oligomers useful according to the invention can be purchased and/or prepared by conventional methods known in the art.

Figure 9:
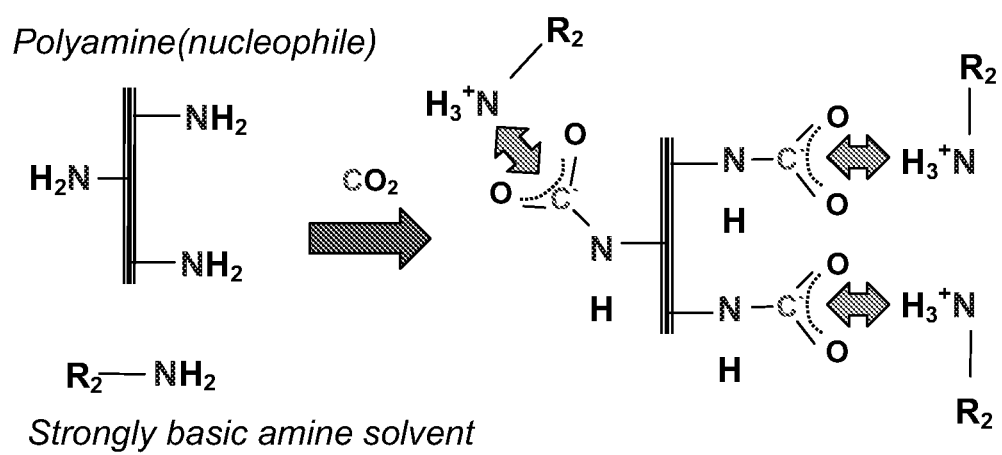
FIG. 9 shows the general concept of $CO_2$ reaction with multiamine molecules in a strongly basic amine solvent.

Alternately, the polyalkyleneimines can be optionally treated under conditions sufficient to eliminate or reduce the number of primary amines (preferably without significant crosslinking), e.g., via reaction such as with a monoepoxide such as illustrated for a polyethyleneimine treated with 1,2-monoepoxyhexane (MEH) in FIG. 9, which can advantageously remove or reduce the likelihood that such primary amines could contribute to forming ammonium carbamates. Different monoepoxides can show different selectivities towards reaction with primary versus secondary amines to create different contents of potentially chemisorptive (and even physisorptive) species in the polyalkyleneimine. In such alternate embodiments, the monoepoxide can include, but are not limited to, terminal (1,2-) aliphatic epoxides, internal aliphatic epoxides, cyclic or multicyclic aliphatic epoxides, aromatic epoxides, aliphatic alkyleneoxides (e.g., having from 2 to 12 carbons, from 4 to 12 carbons, from 4 to 10 carbon atoms, or from 4 to 8 carbon atoms), or the like, substituted/functionalized or without substituents, or combinations thereof. Non-limiting examples of such monoepoxides can be purchased and/or prepared by conventional methods known in the art and can include, for example, ethylene oxide, propylene oxide, 1,2-epoxybutane, 2,3-epoxybutane, 1,2-epoxyhexane, 1,2-epoxyoctene, 1,2-epoxydecane, 1,2-epoxydodecane, 1,2-epoxy-2-methylbutane, styrene oxide, cyclohexene oxide, and combinations thereof. In certain of these embodiments, the monoepoxide may contain only C, H, and O atoms and can lack other heteroatoms such as halides, phosphorus, silicon, or nitrogen. Additionally or alternately in these embodiment, the monoepoxide may contain only C, H, and O atoms and may contain only one O atom (that of the epoxide functionality). Further in such alternate embodiments, the optional treatment can yield a reaction product that is a polyalkyleneimine where some or all of the primary amines are converted to secondary and/or tertiary amines, which reaction product contains, by virtue of the epoxide reaction, one or more secondary hydroxyl groups. Still further in such alternate embodiments, treatment conditions, such as temperature, pressure and contact time, may vary greatly. Any suitable combination of such conditions may be employed herein that are sufficient to produce the desired polyalkyleneimines described herein; typically, the treatment can be carried out by combining the reactants in any order under ambient pressure with contact time varying from seconds to a few hours or greater. In various embodiments, the treated polyalkyleneimine can contain primary amines that have been doubly reacted with the monoepoxide to produce tertiary amines bearing two secondary hydroxyl moieties. Though a goal of treatment can be to eliminate primary amines from the polyalkyleneimine, the treated polyalkyleneimines can still contain some residual (reduced number of) unreacted primary amines. Additionally or alternately, the treated polyalkyleneimine can contain some primary amines that have reacted to form secondary and/or tertiary amines, but substantially no secondary amines in the treated polyalkyleneimine can be observed to have formed tertiary amines. Further additionally or alternately, the treated polyalkyleneimine can contain some primary amines that have reacted to form secondary amines, but substantially no primary amines that have further reacted to form tertiary amines.

The polyalkyleneimines useful in the methods according to the invention can exhibit only secondary amines (only unbranched cyclic, typically not subjected to the optional treatment), only primary and secondary amines (e.g., typically unbranched, linear or cyclic; typically not subjected to the optional treatment), only secondary and tertiary amines (e.g., typically but not necessarily subjected to the optional treatment), only primary and tertiary amines (highly uncommon and typically not subjected to the optional treatment), or primary and secondary and tertiary amines (which may or may not have been subjected to the optional treatment). In such cases where only primary and secondary amines are present, the average molar ratio of primary amines to secondary amines can range from about 2:1 to about 1:40, for example from about 2:1 to about 1:20, from about 2:1 to about 1:15, from about 1:1 to about 1:40, from about 1:1 to about 1:20, from about 1:1 to about 1:15, or from about 1:1 to about 1:10. In such cases where only secondary and tertiary amines are present, the average molar ratio of secondary amines to tertiary amines can range from about 15:1 to about 1:3, for example from about 10:1 to about 1:2 or from about 6:1 to about 1:1. In such cases where primary, secondary, and tertiary amines are all present, at least one or more of the following can advantageously apply: the average molar ratio of primary amines to secondary amines can range from about 5:1 to about 1:50, for example from about 5:1 to about 1:30, from about 5:1 to about 1:15, from about 3:1 to about 1:30, from about 3:1 to about 1:15, or from about 3:1 to about 1:10; the average molar ratio of secondary amines to tertiary amines can range from about 15:1 to about 1:10, for example from about 10:1 to about 1:5; and the average molar ratio of primary amines to tertiary amines can range from about 10:1 to about 1:50, for example from about 10:1 to about 1:30, from about 10:1 to about 1:20, from about 10:1 to about 1:10, from about 5:1 to about 1:10, from about 5:1 to about 1:30, from about 5:1 to about 1:20, or from about 5:1 to about 1:10.

FIG. 8B shows a representative product structure obtained from the reaction using a mixture of polyethylenimine and cyclohexene oxide. As shown in FIG. 8A, polyethylenimine can contain a mixture of primary, secondary, and tertiary amine sites, and the representative product shown in FIG. 8B would result if the epoxide were to only react with the primary amine sites. While a selective reaction of the epoxide with the primary amines may be beneficial in some cases, it should be obvious to those skilled in the art that, in the absence of factors to promote this selectivity, a relatively random (aselective) reaction of the epoxide with both the primary and secondary amines can be expected.

It has been observed that non-aqueous (DMSO-$d_6$ and $CDCl_3$) solutions of PEI at concentrations as low as ~10 wt %, can form viscous gels after several minutes of $CO_2$ flow (~5.5 cc/min) through the solution at room temperature (~24° C.). Liquid phase $^{13}C$ and $^{1}H$ NMR spectra of these solutions showed no signals attributable to dissolved PEI. Without being bound to theory, this phase separation was attributed to the formation of [PEI]⁻ [PEI]⁺ ion pairs, and reaction of $CO_2$ with a PEI polyamine that has been modified/treated by reaction with either cyclic or acyclic monoepoxides (m-PEI) has been observed to form [m-PEI]⁻ [m-PEI]⁺ ion pairs that do not appear to phase separate in the non-aqueous solvent. As illustrated in the Examples below, epoxylated PEI (m-PEI) can be utilized in the mixed amine/strong base scheme described above with beneficial improvement in $CO_2$ absorption.

Although only the polyalkyleneimines have been disclosed hereinabove to be optionally treated, e.g., with a monoepoxide, it should be understood that the primary and/or secondary amine sorbent materials can optionally have been similarly treated, so long as not all amine groups become tertiary amines, i.e., such that some primary and/or secondary amine groups in the sorbent materials remain.

One potentially favorable economic aspect of the present non-aqueous process is that it can enable less costly, weakly basic amines such as aniline (predicted $pK_a$ ~4.6) to achieve effective capture of the $CO_2$. Product stoichiometry, loading, and/or absorption/desorption kinetics may be further manipulated advantageously by varying the structure of the amines used (e.g., by attaching electron-withdrawing and/or donating groups) to provide different inherent basicities ($pK_b$'s) and/or steric properties. A useful means of making an adequate prediction of the $pK_a$ value of the amine can be the ACD/PhysChem Suite™ (a suite of software tools for the prediction of basic physicochemical properties including $pK_a$), available from Advanced Chemistry Development, Inc., 110 Yonge Street, Toronto, Ontario, Canada M5C 1T4. Exemplary $pK_a$ values for a limited number of compounds are given in the Bordwell online $pK_a$ database, http://www.chem.wisc.edu/areas/reich/pkatable/index.htm.

Strong Base

In addition to the weakly basic amine(s), the sorbent medium can also contain one or more non-nucleophilic, more strongly basic compounds which can provide the Bronsted base function in the reaction to form the carbamate. This class of bases can be represented generally as non-nucleophilic and having a $pK_a$ as measured and/or predicted at ~25° C. in aqueous solution (or as measured in other solvent and converted to an aqueous value, referred to as aqueous equivalent scale) higher than that of the nucleophilic amine, which pKa can be at least 8.5, e.g., at least 9.0, at least 10.0, at least 12.0, or at least 13.0 (which values indicate progressively more stable carbamate formation). The ACD/PhysChem Suite may be used for making a prediction of the $pK_a$ value of the base in many cases.

The strong base, typically a nitrogenous base, can advantageously be basic enough to influence the equilibrium towards the carbamate effectively, but on the other hand, not necessarily so strong as to stabilize the carbamate to the point that the effect becomes irreversible/too difficult, and thus to the point that desorption of the $CO_2$ becomes difficult/infeasible, e.g., by an inconveniently high temperature requirement. Bases which are not acceptable are those that may undesirably influence the reaction chemistry of $CO_2$ (e.g., including but not limited to hydroxide bases that form water upon protonation). The base can preferably additionally lack the propensity to act as a competing nucleophile towards $CO_2$ under the conditions of the sorption process, although some degree of nucleophilicity may be tolerated.

Non-nucleophilic nitrogenous bases useful for promoting the carboxylation reaction with the ionic liquid sorbents can include cyclic, multicyclic, and acyclic structures, such as imines, heterocyclic imines and amines, amidines (carboxamidines), including the N,N-di(lower alkyl) carboxamidines (e.g., lower alkyl preferably being $C_1$-$C_6$ alkyl), N-methyltetrahydropyrimidine, 1,8-diazabicyclo[5.4.0]-undece-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), guanidines, including substituted guanidines of the formula $(R^1R^2N)(R^3R^4N)C=N-R^5$ where $R^1$, $R^2$, $R^3$, and $R^4$ are preferably lower alkyl (e.g., $C_1$-$C_6$) and $R^5$ is preferably H, such as 1,1,3,3-tetramethylguanidine, and combinations thereof. Additionally or alternately, other substituents, such as higher alkyl, cycloalkyl, aryl, alkenyl, and substituted alkyl as defined previously, and other structures may be used. These strong nitrogenous bases can typically be used on a 1:1 molar basis with each amine group of the weak amine in order to form the desired mixed carbamate. Because such bases can be non-nucleophilic under the conditions of the sorption process, they may advantageously not engage in an N-carboxylation reaction with $CO_2$. When the weak amine comprises a bi- and/or polyamine, the use of less than one mole of the strong base per amine group can be possible but not preferred because it can tend to reduce the $CO_2$ sorption capacity of the system correspondingly, e.g., by limiting the ability to form the mixed carbamate at each of the available nucleophilic amino groups.

The weak/strong base combination can preferably be selected so that there is a certain minimum difference between the $pK_a$ of the weak base and of the strong base. This can enable the components of the combination to be selected in accordance with the service requirements. For example, one such requirement can include the temperature at which the sorption/desorption steps can be carried out, a factor which itself may be dependent on the temperature of the incoming gas steam, e.g., flue gas at a relatively high temperature. Thus, a base such as n-butylamine ($pK_a$ ~10.7) can be used in combination with a base such as TMG ($pK_a$ ~15.2) rather than a base with a $pK_a$ only slightly higher, such as 1,5-dimethylhexylamine ($pK_a$ ~11.4). A difference of at least 3, and preferably at least 5, can be preferred with particularly desirable/optimal results when the difference is at least 6.

Figure 2:
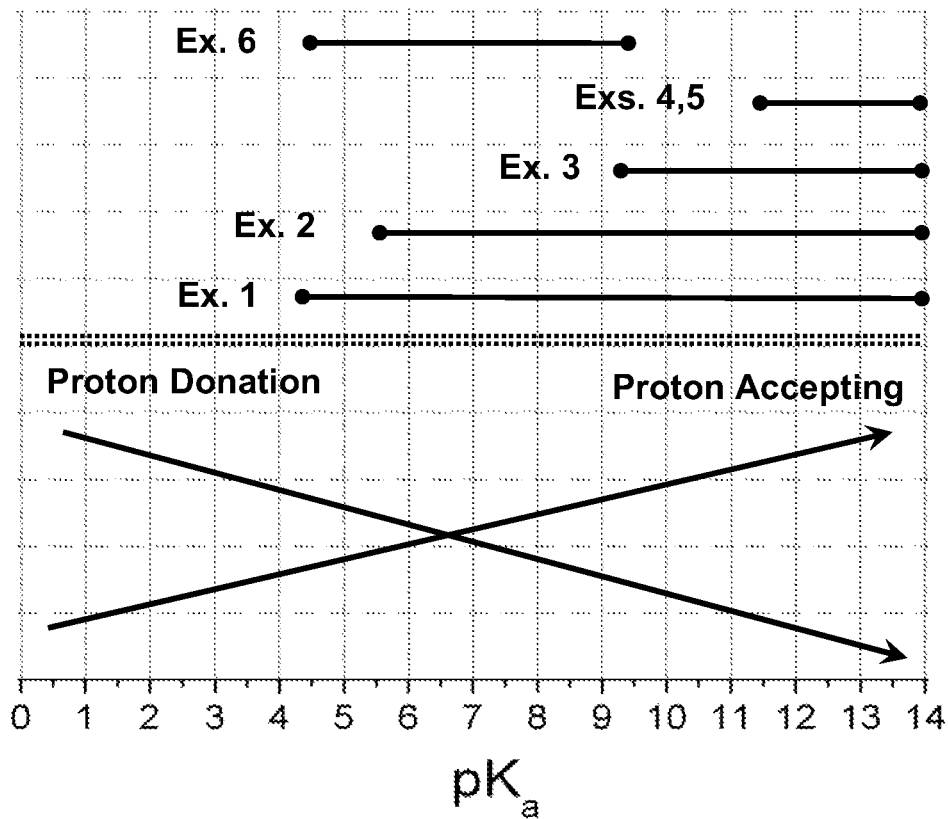
FIG. 2 is a graph relating the relative basicities of the two types of base present in the sorbent solution.

Since a wide range of bases may be used in the present process with their basicities (as measured by their respective $pK_a$ values) extending over a wide range, certain bases, typically with intermediate $pK_a$ values, may act as a weak base in certain combinations and as a strong base in others. 1,5-diamino-3-oxapentane (DAOP, predicted $pK_a$ ~9.07) and/or 1,5-bis(methylamino)-3-oxapentane (BMAOP, predicted $pK_a$ ~9.87), for example, may be used as strong bases with weakly basic amines such as aniline, or may alternately function as weak bases in combination with the stronger bases like an amidine and/or guanidine, such as TMG ($pK_a$ ~15.2). The suitability of various bases for use in combination with each other may be selected on a continuum relating their electron-donating (Lewis base) and proton-accepting (Bronsted base) characteristics. This can be seen in FIG. 2, which shows that, while a distinction in hypothetical terms between weak bases and strong bases can be set at the midpoint of $pK_a$ about ~7, various combinations not adhering to this arbitrary distinction can be possible. The selected mid-point of $pK_a$ ~7 is the center of the aqueous pH scale but is not, however, inherently significant for a non-aqueous system. The upper portion of FIG. 2 shows the $pK_a$ values of the base pairs used in the Examples, with Example 6 illustrating the case where the strong base (BMAOP) is just strong enough to promote the formation of the carbamate with a very weak base such as aniline, although the yield of the mixed base carbamate in that Example was limited, indicating the possibility of participation by the strong base in the nucleophilic reaction with the $CO_2$. Conversely, Example 3 used the BMAOP as the weak base in combination with a very strong base, TMG, with favorable results.

It has been discovered that the use of a primary amine as the weak base can provide a possibility for the capture of about two moles of $CO_2$ by the amine to form products with greater than ~1:1 $CO_2$:amine stoichiometry. The dicarboxylated form of the amines has, however, been found to be the least stable reaction product formed by the $CO_2$ sorption, while the monocarboxylated form (stabilized by the strong base) showed higher stability. The dicarboxylated products may show two-stage decomposition behavior (relatively facile desorption back to monocarbamate, then less facile desorption to pure amine/non-nucleophilic base). The relatively lower stability of the dicarboxylated form can therefore militate against its formation in the present high temperature sorption, although some dicarboxylation may take place towards the lower end of the temperature range when sufficient non-nucleophilic base is present, e.g., when used as a solvent or co-solvent.

Combined Polyamine/Strong Base Absorption Process

FIG. 9 illustrates the use of a nucleophilic polyamine with a non-nucleophilic strong base. When saturated with $CO_2$, this amine mixture is capable of forming a relatively high density of carbamate ions whose negative charge can be balanced by the ammonium counterions formed by the strongly basic amine solvent. The small, rapidly diffusing strong base solvent can effectively balance the carbamate anions formed at the amine sites of the higher molecular weight polyamine. In the absence of the strongly basic amine solvent, a polyamine would have to provide both the cations and anions of the carbamate ion pair. The limited mobility of the bulky polyamines could limit their ability to achieve charge balance at all potential carbamate sites. In addition, this situation could predictably produce increasing viscosity, due to the formation of intermolecular [polyamine]⁻–[polyamine]+ ion pairs. Thus, by using a mixture of polyamine and a low molecular weight, strongly basic amine in certain embodiments, a relatively high level of amine site utilization can be achieved without incurring substantial (or unacceptable) viscosity increases.

Solvent

The amine/base mixture may be used as the neat liquid sorbent material provided that it remains sufficiently liquid to be pumped and handled in the unit. In certain embodiments, for this reason, diamines and higher amines for the most part tend not to be preferred without a solvent, since gels and other viscous reaction products may be formed with the $CO_2$ due to the di-/poly-functionality of molecules and/or the potential for strong intermolecular interactions. In any event, it has been found that the solvent may enhance the capability of the sorbent to react with the $CO_2$ at desirable $CO_2$:amine adsorption ratios, especially when dicarboxylation of a primary amine is a particular objective. The use of the solvent can enable the viscosity of the sorbent medium to be controlled to maintain pumpability, so that it may be circulated readily in the unit and/or so that the concentration of the amine/base in the solvent may be adjusted to maintain the desired solution viscosity as needed, particularly for the rich solution containing the sorbed $CO_2$.

Preferred solvents used in the present process can include non-aqueous, aprotic solvents, with more polar solvents being generally preferred over less polar solvents. Polar solvents in such amine/base mixed systems may be capable of solvating the hypothetical zwitterion and carbamic acid pairs better, as compared to solvents of lower polarity, and so can mitigate the tendency of the ion pairs to form dimers in solution. A polar solvent can additionally or alternately increase physical absorption of the $CO_2$, which can increase the concentration of $CO_2$ in solution, thereby facilitating increased loading and capacity of the absorbent. A significant advantage of the non-aqueous solvent processes herein can include a reduction in corrosivity of the acid gas solutions as compared to the aqueous-based systems, thereby enabling more extensive use of cheaper metallurgies, e.g., carbon steel, in associated equipment with reduced concern about corrosion at higher $CO_2$ loadings.

In addition to preferred solvents being non-aqueous, polar, and aprotic, they can preferably also have a boiling point of at least 65° C. (for example 70° C. or higher), in order to reduce solvent losses in the process, and higher boiling points tend to be more desirable, of course depending on the regeneration conditions which are to be used. If the regeneration is to be carried out at a temperature above 100° C., e.g., if so required for the desorption and/or to remove any water that may enter the system, a boiling point above 100° C., sometimes above 150° C. or even higher, may be preferable. Use of higher boiling point solvents can conserve valuable energy that could otherwise be consumed in vaporization of the solvent. The use of a polyamine having a higher molecular weight than typically employed mono-amines, as disclosed herein, can enable the use of a higher desorption temperature without suffering too large an amine loss due to vaporization.

Solvents found effective to various extents can include toluene, sulfolane (tetramethylene sulfone), and dimethylsulfoxide (DMSO). Although toluene has a low dipole moment, indicating a low degree of polarity, it is adequately polar for use in the present process as shown by experiment. Other solvents of suitable boiling point and dipole moment could include, but are not limited to, acetonitrile, dimethylformamide (DMF), tetrahydrofuran (THF), ketones such as methyl ethyl ketone (MEK), esters such as ethyl acetate and amyl acetate, halocarbons such as 1,2-dichlororobenzene (ODCB), and combinations thereof. Dipole moments (D) and boiling points for selected solvents are:

|  | Dipole Moment (D) | Boiling Point (° C.) |
|---|---|---|
| Toluene | 0.36 | 110.6 |
| Sulfolane | 4.35 | 285 |
| DMSO | 3.96 | 189 |
| DMF | 3.82 | 153 |
| MEK | 2.78 | 80 |
| Acetonitrile | 3.92 | 81 |
| THF | 1.63 | 66 |
| ODCB | 2.50 | 180.5 |

Additionally or alternatively, an ionic liquid can be used/included as a solvent, notwithstanding that certain ionic liquids appear to favor the formation of carbamic acid products (which have a 1:1 amine:$CO_2$ stoichiometry) and to inhibit the formation of carbamate products (2:1 stoichiometry). The ionic liquids may themselves act as useful chemisorbents for $CO_2$ under the conditions contemplated for use in the present process and may therefore be useful in this adjunct role. Many of them are nonflammable, non-explosive, and have high thermal stability. They can also be recyclable, which can be helpful in reducing environmental concerns over their use.

A class of ionic liquids which has been found to be highly effective as solvents and/or $CO_2$ chemisorption agents can include, for example, imidazolium, benzimidazolium, imidazolidinium (4,5-dihydro-1H-imidazolium), diazolium, and thiazolium salts with a hydrogen at the 2-position. Imidazolium salts found to function well as solvents and chemisorbents for $CO_2$ include the 1,3-dialkyl substituted imidazolium salts with preference for the acetate salts (but other salts may be considered, such as those with halide, thiocyanate, or lower alkyl chain carboxylate anions), particularly those derived from the 1,3-di(lower alkyl) imidazolium cations, where lower alkyl is $C_1$-$C_6$ (preferably $C_1$-$C_4$) alkyl, as exemplified by 1-ethyl-3-methyl imidazolium acetate and 1-butyl-3-methyl imidazolium acetate.

Preferred anions for forming salts with the cations of the ionic liquid can include those in which the conjugate acid of the counterion has a $pK_a$ as measured and/or predicted at ~25° C. in aqueous solution (or as measured in other solvent and converted to an aqueous value, referred to as aqueous equivalent scale) of at least 0, for example of at least 2.0 or of at least 4.0. The anion of the ionic liquid salt can affect its ability to act as an agent for $CO_2$ capture, with more basic anions (such as acetate and/or thiocyanate) enhancing chemisorption and less basic anions (such as chloride) being ineffective and/or less effective in enhancing chemisorption. A useful means of making an adequate prediction of the $pK_a$ value of the counterion can include use of the ACD/PhysChem Suite™ (a suite of software tools for the prediction of basic physicochemical properties including $pK_a$), available from Advanced Chemistry Development, Inc., 110 Yonge Street, Toronto, Ontario, Canada M5C 1T4. For further specificity on ionic liquids, reference can be made to the relevant portions of U.S. Patent Application No. 61/381,281, filed Sep. 9, 2010, and its corresponding non-provisional application, both of which are hereby incorporated by reference.

Once the absorbent medium has been formulated with amine/base combination and the solvent, optionally with ingredients such as antioxidants, corrosion inhibitors, antifoaming agents, and the like, it can be employed, for example, in an absorption unit, as illustrated in outline in FIG. 1.

The concentration of the amine, base, and solvent (if present) can vary over a wide range, e.g., from 5 to 90 wt %, from 10 to 90 wt %, from about 10 to about 50 wt %, or from about 10 to about 30 wt %, for the amine/base combo in solvent. Since the sorption temperature and $pK_a$ of the amine and strong base may also play into the reaction equilibrium, the optimal (or merely a desirable) concentration may be determined empirically taking this into account, along with sorbent viscosity and/or other factors.

Solid Phase Operation

While the present process can be suited to operation in the liquid phase, the same chemistry can alternately be conducted in the pores or on the surface of a porous, solid support. This may involve impregnating a solution of the amine component and the non-nucleophilic strong base into a porous support, depositing the amine component and the non-nucleophilic strong base (e.g., via solution) onto a porous support, and/or chemically grafting one or both of the amine and strong base onto the surface of the support by chemical reaction between the support material and the amine and/or base. Additionally or alternately, a precursor of the amine and/or base may be used and/or a reactive compound containing the amine/base groups required for participation in the carboxylation reaction. Common support materials can include carbon (activated charcoal), as well as porous solid oxides of metals and metalloids and mixed oxides, including but not limited to alumina, silica, silica-alumina, magnesia, titania, and zeolites, inter alia. Porous solid polymeric materials can additionally or alternately be suitable, provided that they are sufficiently resistant to the environment in which the sorption reaction is conducted. Regeneration, in this case, could be achieved by operating in a temperature swing sorption mode by heating the solid containing the sorbed $CO_2$ to decompose the $CO_2$/amine/base reaction products (dicarboxylate/carbamate/carbamic acid) on the support surface to release the sorbed $CO_2$. Heating can conveniently be accomplished by passing a heated gas stream through a bed of solid sorbent, e.g., in a countercurrent direction to that of the initial gas stream; the purge gas may be supplied using a slipstream from the purified gas stream. In this way, energy savings may be achieved by avoiding the necessity of heating large volumes of solution.

As the components of the gas stream tend to have relatively small molecular dimensions, the minimum pore size of the support may not, in itself, be a severely limiting factor, but, when the basic nitrogenous compounds are impregnated, the entrances to the pore systems of small and intermediate pore size zeolites may become occluded by bulky amine/base component(s) and, for this reason, may not be preferred with the amines and bases of relatively larger molecular dimensions. In order to minimize diffusion limitations, especially with bulky amine and/or base components, the preferred porous solid support materials can have relatively large pore sizes, with mesoporous and macroporous materials, as well as large pore zeolites, being particularly suitable. Amorphous porous solids with a range of different pore sizes are likely to be suitable, since at least some of the pores should have openings large enough to accept the basic component(s) and then to leave sufficient access to the components of the gas stream. Supports containing highly acidic reaction sites, as with the more highly active zeolites, are more likely to be more susceptible to fouling reactions upon reaction with the nitrogenous compound than less acidic species are therefore less likely to be preferred.

A preferred class of \mesoporous/macroporous materials (as defined by IUPAC) can include the silica compounds of the M41S series, including MCM-41 (hexagonal), MCM-48 (cubic), and other mesoporous materials such as SBA-15.

Absorption/Desorption Conditions

For absorption processes herein, the temperature can typically be in the range from about 20° C. to about 90° C., for example from about 25° C. to about 75° C., from about 45° C. to about 75° C., or from about 45° C. to about 90° C., with greater sorption typically achieved at lower temperatures within these ranges. In most cases, therefore, a maximum temperature for the sorption can be about 80° C. (or alternately about 70° C.). The sorption temperature can typically correlate in an inverse manner with the partial pressure of the $CO_2$ in the entering gas stream; higher $CO_2$ partial pressures can enable higher sorption temperatures to be used. For example, the lowest possible sorption temperature can be beneficial in treating feedstreams (e.g., flue gas) with ~100 mbar (~10 kPa) partial pressure of $CO_2$. Conversely, absorption can be achieved at much higher temperatures, possibly over 100° C., with feedstreams (e.g., natural gas streams) with much higher $CO_2$ pressure. For flue gas streams, for instance, it can be desirable to operate towards the higher end of the temperature range, since the flue gas can tend to be hot, unless initially cooled to make sorption more favorable. In each case, however, the absorption temperature can be tailored for the sorbent system in use and with regard to the desorption temperature required for that system. The possibility opened up by the use of low sorption temperatures from about 20° C. to about 50° C. or from about 20° C. to about 30° C., however, can offer the possibility of using desorption temperatures below 100° C., e.g., about 75° C. to about 90° C. or about 50° C. to about 90° C., respectively, with consequent savings in process energy requirements.

The absorption pressure can be in the range from about 0.1 barg (about 10 kPag) to about 20 barg (about 2 MPag), for example from about 0.1 barg (about 10 kPag) to about 10 barg (about 1 MPag). The partial pressure of carbon dioxide in the gas mixture can vary according to the gas composition and/or the pressure of operation, but can typically be from about 0.1 barg (about 10 kPag) to about 20 barg (about 2 MPag), for example from about 0.1 barg (about 10 kPag) to about 10 bar (about 1 MPag). The gas mixture can be contacted counter-currently or co-currently with the absorbent material at a gas hourly space velocity (GHSV) from about 50 (S.T.P.)/hour to about 50,000 (S.T.P.)/hour.

The low pressure of flue gas can, in general, represent a significant limitation for $CO_2$ recovery, since the $CO_2$ can be absorbed much more easily at higher pressures, but the cost of compression can be relatively high and can tend not to be favored with the present sorption systems with their high sorption capacities. The pressure when treating flue gas which enters from the combustion source at a low pressure is unlikely to exceed about 1 atmosphere gauge (~100 kPag) unless a separate means is utilized to increase pressure. Natural gas recovery and processing is commonly at a much higher pressure and may enter the treatment process at a pressure typically in the range from about 1 atm (~100 kPag) to about 90 atm (~9.1 MPag), with the actual value selected being dependent on pipelining specifications and/or the extent to which it is desired to eliminate recompression following treatment, for example. All references to values of pressure in units of bars herein are in absolute pressures unless otherwise specifically noted.

The carbon dioxide can be desorbed from the absorbent material by one or more of several methods. One possibility can be to desorb the carbon dioxide by means of stripping with an inert (generally non-reactive) gas stream such as nitrogen in the regeneration tower. The reduction in the $CO_2$ partial pressure that can occur on stripping can promote desorption of the $CO_2$, and, when this expedient is used, a significant pressure reduction may not be required, although the pressure may be reduced for optimal/better stripping, suitably to the levels used in pressure swing operation. Additionally or alternately, a pressure swing process may be used to reduce the pressure on the liquid absorbent to a relatively lower value than that prevailing in the sorption phase.

When carrying out desorption by inert gas sparging and/or pressure swing operation, the temperature may be maintained at a value at or close to that used in the adsorption step. Desorption can, however, be favored by an increase in temperature, with or without stripping and/or a decrease in pressure.

When the absorbent is loaded with $CO_2$ to a satisfactory level, the sorbent system can be regenerated by desorption of the $CO_2$. Regeneration can be conveniently effected in a regeneration tower, e.g., by reducing the partial pressure of the $CO_2$ by stripping with a non-reactive gas such as nitrogen, by increasing the temperature of the amine rich stream from the absorber, and/or by reducing the pressure, or a combination of any of these expedients. During this step, the $CO_2$ may be removed and can be taken to utilization and/or sequestration and the sorbent medium freed for recycle to the absorber. An additional or alternative option can be to decompose the carbamate/carbamic acid with substantially pure $CO_2$ (previously isolated) at ~1 atm (~100 kPa partial pressure) or higher at relatively high temperatures, typically at least 120° C., at which the carbamic acid/carbamate reaction product can be decomposed. Stripping with a $CO_2$ stream at a desorption temperature of at least 120° C. and at a pressure greater than ~1 atm (~100 kPa partial pressure) may give a significant advantage in order to remove any water that may have entered the system since under these conditions; water can thus be removed from the mixed sorbent system and can be separated from the $CO_2$ in a further downstream separation step, e.g., a pressure swing operation, for instance at an elevated temperature above ambient.

In principle, the mixed amine/base sorbent medium can manage trace amounts of water entering with the gas stream by using a molar excess of base, which can form a bicarbonate product with $CO_2$ and $H_2O$, while the ionic liquid can react with $CO_2$ and the majority of base. The bicarbonate formed by reaction of the water with the excess base can be decomposed at temperatures above ~100° C. (typically at ~100-140° C., depending on the basicity of the base).

In any event, the desorption temperature can typically be about 120° C. or less, and successful desorption may be achievable at temperatures not exceeding about 100° C. (e.g., from about 70° C. to about 90° C., from about 70° C. to about 95° C., from about 75° C. to about 90° C., or from about 75° C. to about 95° C.), with lower values (e.g., from about 30° C. to about 70° C., from about 30° C. to about 50° C., or from about 50° C. to about 70° C.) if sorption is carried out at low temperature. In the non-aqueous environment, particularly where an ionic liquid solvent is present, stripping can be feasible with or without purge gas at relatively lower temperatures. The possibility of desorption at lower temperatures can offer the potential for isothermal (or near isothermal) stripping using a purge gas at a temperature the same as, or not much higher than, the sorption temperature (for example, at a temperature not more than 30° C. higher than the sorption temperature); in favorable cases, it may be possible to attain a sorption/desorption temperature differential of no more than 20° C.

As noted above, the flue gases which may be treated by the present process include water from the combustion process; untreated natural gas may be similar. With desorption/regeneration temperatures above 100° C., any water entering the system will be kept at a low level and for this reason competing reactions will not be significant. Water entering the low temperature processes with desorption/regeneration operating at temperatures under 100° C. may be driven off by the stripping which takes place during the regeneration. The entering gas stream can, however, be dehumidified prior to contacting with the sorbent solution. The dehumidification can be carried out by conventional methods. For example, the dehumidification can be carried out by absorption over solid sorbents such as molecular sieves, silica gels or aluminas or by cooling to condense the water content of the stream.

It should be appreciated that conventional equipment can be used, in whole or in part, to perform the various functions of the non-aqueous amine scrubbing processes/steps described herein, such as monitoring and/or automatically regulating the flow of gases, e.g., to enable fully automated and/or continuous process control in an efficient manner.

The mixed amine/base sorbent system is not necessarily limited to removal of $CO_2$ but, in view of the system chemistry, can be capable of removing $H_2S$ and/or other acid gases such as those typically found in flue gas and/or wellhead natural gas.

EXAMPLES

Example 1

Mixed Carbamate Formation with Aniline/1,1,3,3-tetramethylguanidine

An approximately 26.7 wt % solution of a ~1:1 molar mixture of aniline ($pK_a$ ~4.6) and tetramethylguanidine (TMG) was prepared in $d_6$-DMSO in a ~10 mm NMR tube fitted with a plastic cap and capillary dip tube. The NMR tube was placed inside a ~10 mm wide-bore Bruker Avance 400 MHz NMR spectrometer with a BBO probe. $CO_2$ (~1 atm, or ~100 kPa partial pressure, and at ~3-5 cc/min flow, as measured by a Brooks 5896™ flow controller) was bubbled through the room temperature (~20-25° C.) solution for approximately 3 hours (until no further $CO_2$ uptake was observed by NMR). The initial spectra of the starting materials changed upon $CO_2$ addition and indicated the formation of one product only (mixed carbamate C=O resonance at ~158.6 ppm). The protonation of the guanidine to guanidinium appeared to be confirmed by the shift of the C=N resonance at ~166.4 ppm upfield to ~161.8 ppm (in relatively fast equilibrium with any remaining guanidine). The remaining structural peaks of the aniline also appeared to shift away and to become distinguished from the starting peaks. The residual amount of unreacted (free) aniline represented by peaks at ~148.8, ~128.6, and ~114.0 ppm indicated that the reaction yield between aniline/tetramethylguanidine/$CO_2$ was less than ~100% at room temperature (~20-25° C.). Based on integration of the product peak at ~158.61 ppm over the sum of the C—N aniline peaks at ~148.8 and ~143.9 ppm, ~90.6 mol % of aniline molecules appeared to react with $CO_2$ to form a mixed carbamate with tetramethylguanidine. Based on individual integration of the C—N peaks of aniline at ~148.8 and ~143.9 ppm, the ratio of reacted to unreacted aniline molecules was calculated to be ~94:6.

Figure 3:
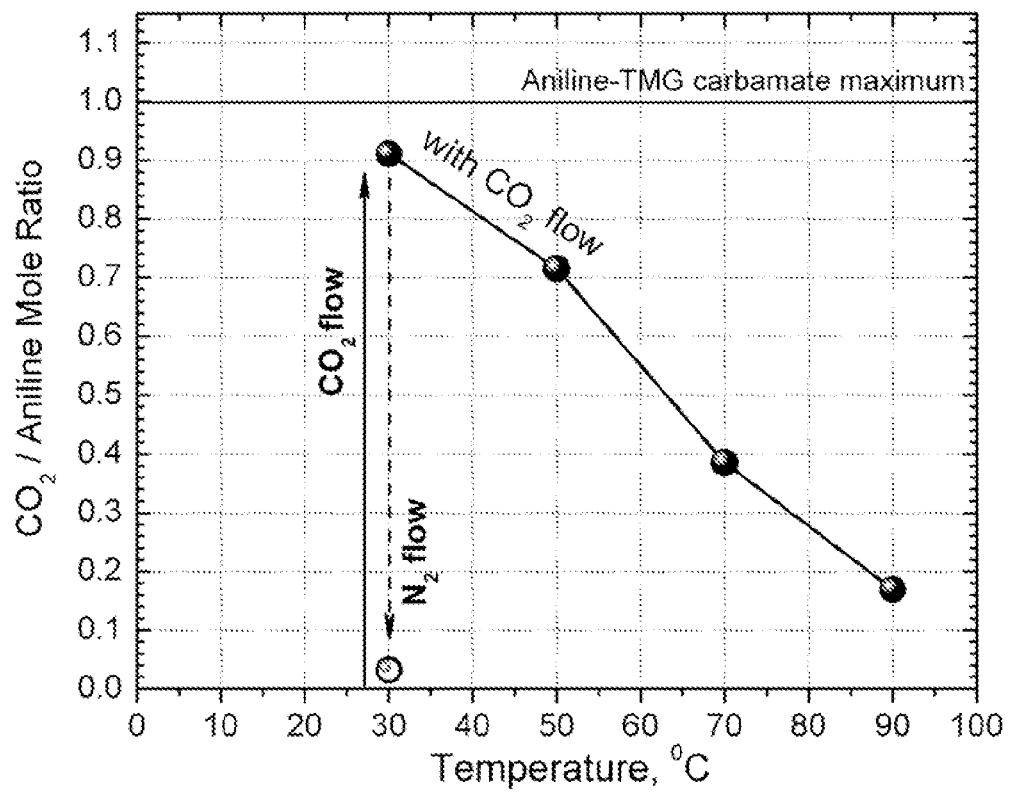
FIG. 3 is a graph showing the $CO_2$ molar uptake and desorption for the aniline/1,1,3,3-tetramethylguanidine (TMG) system of Example 1.
Figure 4:
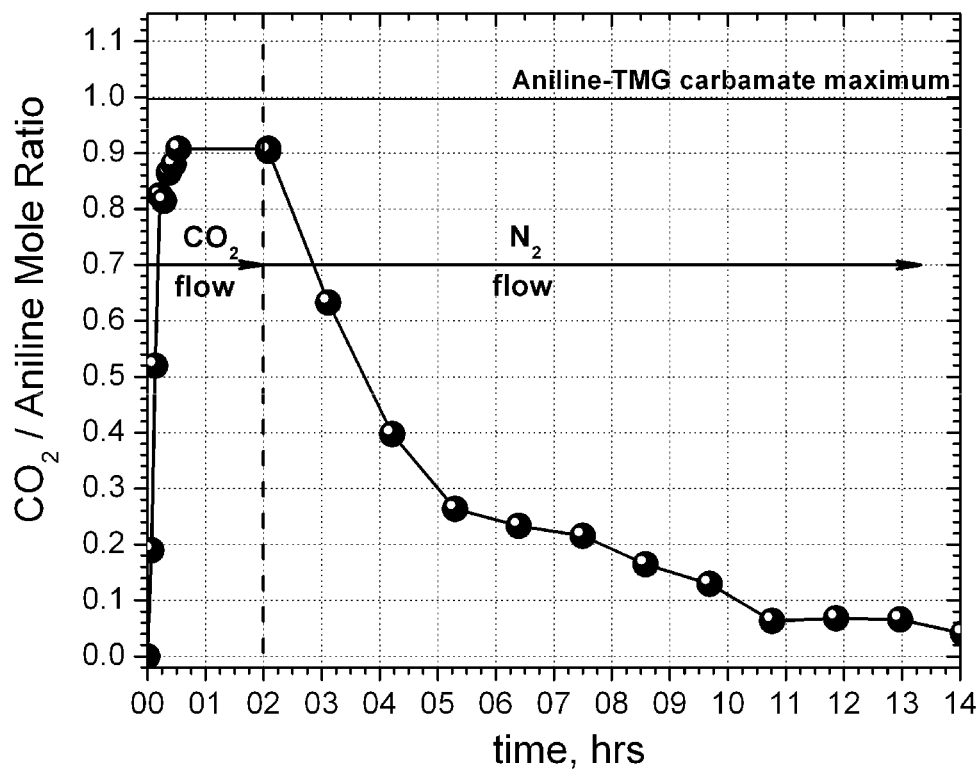
FIG. 4 is a graph showing the $CO_2$ absorption/desorption profile at room temperature of the aniline/TMG mixture from Example 1.

The same procedure was repeated at ~50° C., ~70° C., ~90° C., in order to test the thermal stability of the mixed carbamate. FIG. 3 shows the observed $CO_2$ molar uptake and desorption at various temperatures for the aniline/TMG mixed amine system, and FIG. 4 shows the kinetic plot of molar absorption and desorption at room temperature over time with nitrogen being bubbled through the solution. With $CO_2$ flow, ~39 mol % of aniline formed a mixed carbamate with the TMG at ~70° C., and ~17 mol % at ~90° C., as shown in FIG. 3, indicating the potential for effective $CO_2$ sorption at relatively high temperatures with desorption of the $CO_2$, and amine regeneration at high temperatures.

The carbamate solution that was fully saturated at ~30° C. (forming more than ~90% mixed carbamate) was then subjected to a $N_2$ gas purge to monitor mixed carbamate stability at relatively low partial pressures of $CO_2$. Bubbling $N_2$ through the product solution (~1 atm, or ~100 kPa partial pressure, at ~10 cc/min) resulted in substantially complete $CO_2$ desorption back to the original amine reagents at room temperature.

For comparison, a similar procedure carried out with only aniline (no second base added) showed no reaction with $CO_2$ in both aqueous and non-aqueous solution. Theoretical calculations indicated that aniline appeared to have sufficient nucleophilicity to form a weakly stable carbamic acid intermediate, but its very low basicity ($pK_a$~4.6) appeared to prevent another aniline molecule from neutralizing the acid to form a stable carbamate salt. As proof of aniline's ability to act as a nucleophile, an unstable aniline carbamic acid in toluene solution was experimentally observed at about −30° C. ($^{13}C$ peak at ~157.2 ppm).

As a very strong base, tetramethylguanidine ($pK_a$ ~15.2) can be capable of accepting a proton from a zwitterion or carbamic acid to form a carbamate. However, carbamic acid formation itself with tetramethylguanidine can be nearly impossible, due to its strong N—H bond. $CO_2$ uptake experiments showed high tetramethylguanidine reactivity in aqueous solution (with bicarbonate formation) and very low reactivity in non-aqueous solution.

Example 1.1

Mixed Carbamate with Aniline/TMG and $H_2O$

Tetramethylguanidine was observed to form a very stable bicarbonate species with $CO_2$ in aqueous solution. In order to probe the competitive reaction between tetramethylguanidine, aniline, and $H_2O$, an approximately 28 wt % solution of a ~1:1 molar mixture of $H_2O$ and tetramethylguanidine was prepared in aniline/water solution (~1:~1:~3.9 molar ratio of $H_2O$, tetramethylguanidine, and aniline). Theoretically, tetramethylguanidine should be able to form 100 mol % bicarbonate with $H_2O$. Using a procedure similar to that described above, the appearance of intermediate and equilibrium reaction products was monitored by NMR for ~13 hours. During $CO_2$ flow, the tetramethylguanidine peak appeared to move upfield and aniline peaks appeared to split, indicating reaction between these two compounds. The $^{13}C$ NMR spectrum at equilibrium had two new peaks at ~160.66 ppm (tetramethylguanidine bicarbonate C=O) and ~159.65 ppm (tetramethylguanidine/aniline carbamate C=O). Based on integration of these peaks versus the N=C peak of TMG/guanidinium (~160.5 ppm), about 15.8 mol % of the tetramethylguanidine formed bicarbonate with water, and the rest of tetramethylguanidine stabilized ~101 mol % of the mixed carbamate with aniline. This total $CO_2$ loading of ~116.8 mol % may have indicated the ability of one tetramethylguanidine molecule to stabilize two aniline carbamates/carbamic acids (since the carbamic acid form of the product is believed to be neutral and is believed not to require a counterion), or one bicarbonate stabilized with water and one carbamic acid stabilized with aniline.

With this aniline/tetramethylguanidine mixture, the mixed carbamate between the two bases can be a preferred product over a bicarbonate between strong base and water. Taking into account that the mixed carbamate between aniline and tetramethylguanidine can be a less stable product over the bicarbonate, a higher yield of mixed carbamate versus bicarbonate may be achieved if more nucleophilic, weaker bases are chosen in tandem with a stronger base to provide the potential for decreasing the role of water in the reaction and increasing the selectivity of $CO_2$ capture from wet gas.

Example 2

Mixed Carbamate Formation with
3,3-Iminodipropionitrile/TMG

An approximately 29.7 wt % solution of a ~1:1 molar mixture of 3,3'-iminodipropionitrile ($pK_a$ ~5.26) and tetramethylguanidine was prepared in $d_6$-DMSO in a ~10 mm NMR tube fitted with a plastic cap and capillary dip tube. The NMR tube was placed inside a ~10 mm wide-bore Bruker Avance 400 MHz NMR spectrometer with a BBO probe. $^{13}C$ and $^1H$ spectra were taken. $CO_2$ (~1 am, or ~100 kPa, and 99.98% purity) was bubbled (~5.5 cc/min, as measured by a Brooks 5896 flow controller) through the room temperature (~20-25° C.) solution, simultaneously recording $^{13}C$ and $^1H$ spectra for approximately 2 hours (until no further changes in NMR spectra were observed). The initial spectra of the starting materials appeared to change upon $CO_2$ addition. New $^{13}C$ and $^1H$ peaks were formed at ~159.85 ppm and ~8.76 ppm, respectively, believed to indicate mixed carbamate formation between the iminodipropionitrile and tetramethylguanidine. ~100 mol % of iminodipropionitrile molecules were believed to have reacted with the $CO_2$ and tetramethylguanidine molecules with a ~1:~1:~1 molar ratio.

Figure 5:
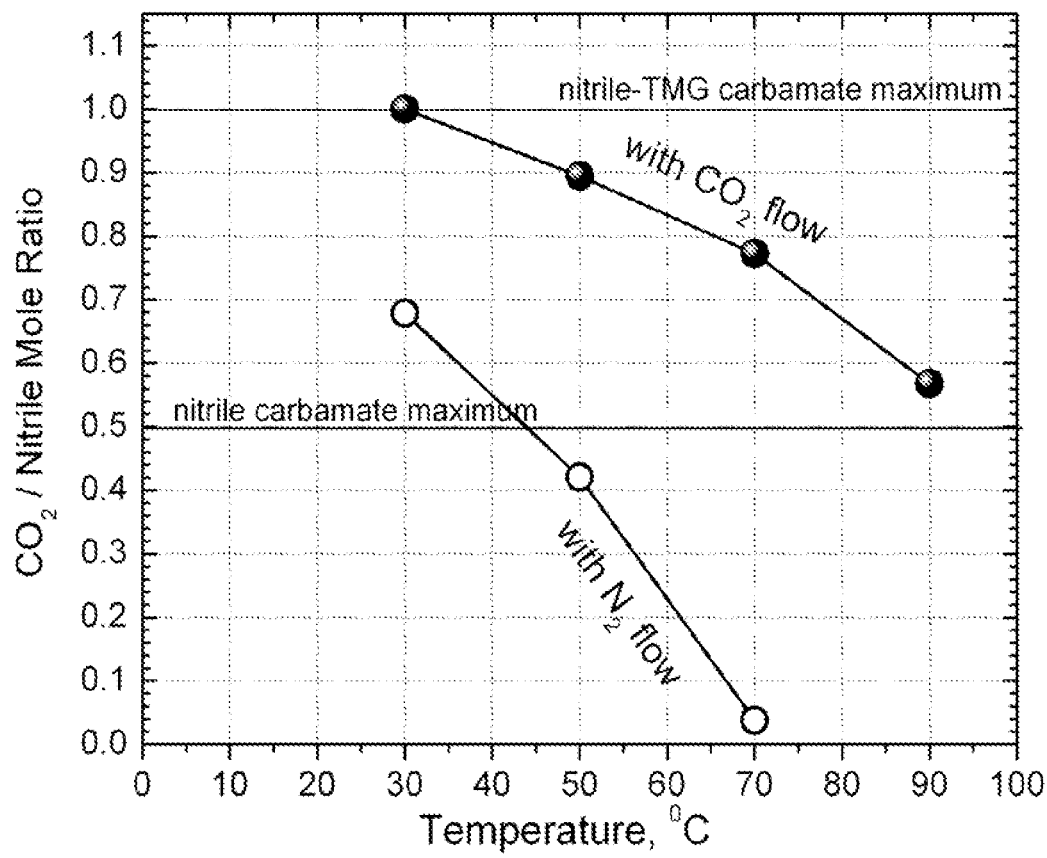
FIG. 5 is a graph showing the $CO_2$ molar uptake and desorption for the 3,3-diiminopropionitrile/TMG system of Example 2.

The same procedure was repeated at ~50° C., ~70° C., ~90° C., in order to test the thermal stability of the mixed carbamate. Gradual decomposition of the mixed carbamate with $CO_2$ desorption and amine regeneration at higher temperatures was observed. ~56.8 mol % of iminodipropionitrile appeared to form a mixed carbamate with tetramethylguanidine at ~90° C., as shown in FIG. 5.

The carbamate solution that was fully saturated at ~30° C. (forming ~100% mixed carbamate) was then subjected to a $N_2$ gas purge to monitor mixed carbamate stability at extremely low partial pressures of $CO_2$. The solution was brought to equilibrium at ~30° C., at ~50° C., and at ~70° C.; nearly all mixed carbamate formations were decomposed at ~70° C. (FIG. 5). A higher yield at elevated temperatures of mixed carbamate under $CO_2$ flow and higher decomposition temperature in $N_2$ gas was achieved, compared to the aniline-tetramethylguanidine mixed carbamate of Example 1.

In contrast, a comparative experiment using only ~15 wt % of 3,3'-iminodipropionitrile in $d_6$-DMSO solution (without tetramethylguanidine) showed formation of a carbamic acid with $CO_2$. Equilibrium loading at ~30° C. was ~35 mol %, ~10 mol % at ~50° C., and ~4 mol % at ~70° C. At ~90° C., the weakly basic iminodipropionitrile did not appear to form stable products with $CO_2$.

Example 3

Mixed Carbamate Formation with BMAOP/TMG

A procedure similar to Examples 1 and 2 was carried out using a ~1:~2.1 mixture of 1,5-bis(methylamino)-3-oxapentane (BMAOP) with $pK_a$ ~9.87 and 1,1,3,3-tetramethylguanidine (~1:1.05 mixture on the basis of amine sites) for ~2 hours. Only one product, a mixed dicarbamate (monocarbamate at each amine site), appeared to form. The $^1H$ NMR spectrum after carboxylation showed movement of the guanidinium protons (in relatively fast equilibrium with any remaining guanidine protons) downfield to ~9.92 ppm, plus movement of the amine —$NCH_2$— backbone resonance from ~2.6 to ~3.2-3.4 ppm. That most of BMAOP molecules reacted was confirmed by the absence of free peaks. Based on integration of the product peak at ~161.6 ppm compared to the sharp C—O peak of DMAOP at ~69.89 ppm, ~99.7 mol % of BMAOP molecules were calculated to have reacted with $CO_2$ to form a mixed carbamate with tetramethylguanidine. The difunctional BMAOP molecules appeared to react with two pairs of tetramethylguanidine and $CO_2$ to form two mixed carbamate moieties per molecule at room temperature (~199.4 mol % of $CO_2$ per DMAOP molecule).

Figure 6:
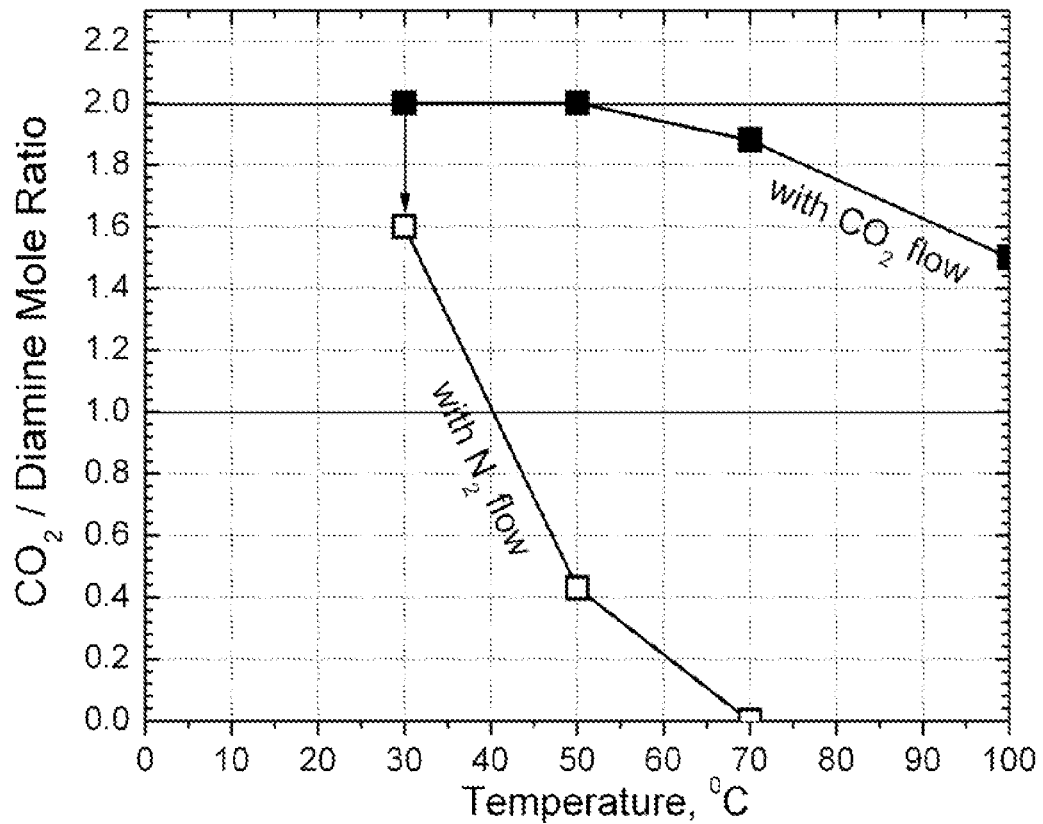
FIG. 6 is a graph showing the $CO_2$ molar uptake and desorption for the 1,5-bis(methylamino)-3-oxapentane/TMG system of Example 3.

The same procedure was repeated at ~50° C., ~70° C., and ~90° C., in order to test the thermal stability of the mixed carbamate. The results are shown in FIG. 6: ~95 mol % of BMAOP appeared to form a mixed carbamate with tetramethylguanidine at ~70° C. and ~75% at ~100° C.

The carbamate solution that was fully saturated at ~30° C. (forming ~100% mixed carbamate with each amine site) was then subjected to a $N_2$ gas purge to monitor mixed carbamate stability at extremely low partial pressures of $CO_2$. Bubbling $N_2$ through the product solution (~1 am, or ~100 kPa, at ~10 cc/min) appeared to result in gradual $CO_2$ desorption back to the original amine reagents at ~70° C. (FIG. 6).

In contrast, a ~15 wt % of BMAOP in DMSO-$d_6$ solution (without tetramethylguanidine) appeared to show formation of carbamic acid with $CO_2$ (~72 mol % per amine or ~145 mol % per difunctional BMAOP). Equilibrium loading at ~50° C. was ~57 mol % of $CO_2$ per amine site of BMAOP, at ~40 mol % at ~70° C., and ~14 mol % at ~90° C.

Example 4

Mixed Carbamate Formation with Piperidine/TMG

Figure 7:
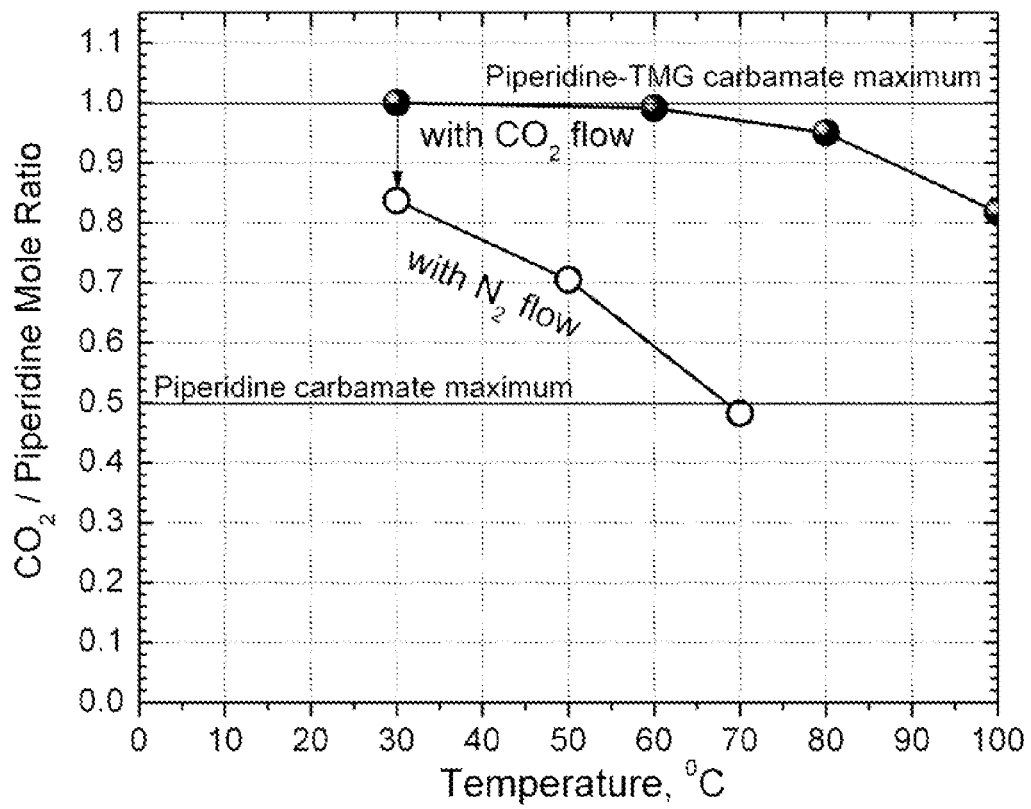
FIG. 7 is a graph showing the $CO_2$ molar uptake and desorption for the piperidine/TMG system of Example 4.

An approximately 22.1 wt % solution of a ~1:1 molar mixture of piperidine ($pK_a$~11.22) and tetramethylguanidine was prepared in $d_6$-DMSO in a ~10 mm NMR tube. A procedure similar to Example 1 was carried out for ~2 hours. New $^{13}C$ and $^1H$ peaks were observed at ~159.93 ppm and ~9.49 ppm, respectively, indicating mixed carbamate formation between piperidine and tetramethylguanidine. ~100 mol % of the piperidine molecules appeared to react with $CO_2$ and tetramethylguanidine molecules with a ~1:~1:~1 molar ratio. As may be seen from FIG. 7, this mixed carbamate appeared to be the most stable product. At ~100° C., ~80.4 mol % of the piperidine molecules remained in the mixed carbamate form with tetramethylguanidine. The high $CO_2$ uptake at this high temperature indicated the potential for a $CO_2$ capture process operating at elevated temperatures, potentially avoiding the necessity of cooling the incoming gas stream to ambient or near ambient temperatures. A relatively thermally stable carbamate such as this, however, can require higher regeneration temperatures. At ~70° C. in a $N_2$ atmosphere (nearly zero $CO_2$ partial pressure), ~50 mol % of piperidine-tetramethylguanidine pairs were able to retain $CO_2$ molecules. At this temperature, piperidine has a relatively high vapor pressure (b.p. ~106° C.), and loss of free piperidine molecules was observed.

Example 5

Mixed Carbamate Formation with Piperazine/TMG

An approximately 30 wt % solution of a ~1:2 molar mixture of piperazine and tetramethylguanidine was prepared in $d_6$-DMSO in a ~10 mm NMR tube. The piperazine molecule has two basic amine sites with respective $pK_a$s of ~9.71 (first protonation) and ~5.41 (second protonation). Approximately two molar equivalents of tetramethylguanidine per piperazine molecule were used in order to monitor mixed carbamate formation with both nitrogens of the piperazine. A procedure similar to that described in Examples 1-2 was used in order to monitor the mixed carbamate formation. During the reaction with $CO_2$, the NMR signals from both piperazine and tetramethylguanidine appeared to decrease. After ~2 hours of reaction, nearly all of the NMR signals from both piperazine molecules and tetramethylguanidine seemed to disappear. White precipitates were observed visually after the sample was removed from the NMR spectrometer. Although there was no spectroscopic confirmation of reacted species, a reaction was assumed between tetramethylguanidine and both amine sites of piperazine based on a similar liquid signal loss of both compounds. The sample was then heated to ~100° C. while flowing $CO_2$ through the precipitates in the DMSO solution.

Example 6

Mixed Carbamate with Aniline/BMAOP

An approximately 19 wt % solution of a ~2.15:1 molar mixture of aniline and 1,5-bis(methylamino)-3-oxapentane (BMAOP) was prepared in $d_6$-DMSO in a ~5 mm NMR tube. The BMAOP molecule has two basic amine sites with (predicted $pK_a$ ~9.87). About 2 molar equivalents of aniline per BMAOP molecule were used in order to monitor mixed carbamates with both amine sites of BMAOP. A procedure similar to that described in Examples 1-2 was applied for ~2 hours. $^{13}C$ and $^1H$ NMR spectra of the mixed solution appeared to change after $CO_2$ addition. Two new $^{13}C$ resonances at ~158.71 ppm (broad) and ~158.07 ppm (sharp) were detected, indicating carbamic acids on BMAOP (~141 mol % per difunctional BMAOP) and BMAOP-aniline mixed carbamate (~21.2 mol % per BMAOP), respectively. The peak splitting of the aniline structure (~9.1:~90.9 reacted vs. unreacted anilines) appeared to confirm low reaction yield of mixed carbamate. In case of the BMAOP/aniline mixture, the preferential $CO_2$ reaction with BMAOP to give homo-carbamic acids may be possible as a result of the stronger base (BMAOP) being more nucleophilic than aniline.

In contrast, a similar experiment on ~15 wt % of BMAOP in DMSO-$d_6$ solution (without aniline) showed formation of carbamic acid with $CO_2$ (~145 mol % per difunctional BMAOP). Addition of weaker base appeared not to increase the total loading of the solution in this case.

The results of Examples 1-6 are shown in Table 1 below.

TABLE 1

Results from Examples 1-6

| Amine ($pK_a$) | Base ($pK_a$) | $\Delta pK_a$ | Mol % Loading Mixed Carbamates in $CO_2$ flow (Mol % $CO_2$ after Desorption in $N_2$ flow) | | | |
|---|---|---|---|---|---|---|
| | | | 30° C. | 50° C. | 70° C. | 90° C. |
| Aniline (4.6) | 1,1,3,3-TMG (15.2) | ~10.6 | ~91 (~0) | ~71 (~0) | ~39 (~0) | ~17 (~0) |
| NC—$C_2H_4$—NH—$C_2H_4$—CN 3,3-iminodipropionitrile (5.26) | 1,1,3,3-TMG (15.2) | ~7.5 | ~100 (~68) | ~90 (~42) | ~78 (~4) | ~57 (—) |
| MeN—$C_2H_4$—O—$C_2H_4$—NMe 1,5-bis(methylamino)-3-oxapentane (9.87) | 1,1,3,3-TMG (15.2) | ~5.33 | ~100 (~80)[#] | ~100 (~20)[#] | ~92 (~0)[#] | ~75 (~0)[#] |
| Piperidine (11.22) | 1,1,3,3-TMG (15.2) | ~3.98 | ~100 (~83) | ~100 (~70) | ~94 (~48) | ~81 (—) |
| Piperazine (5.41, 9.71) | 1,1,3,3-TMG (15.2) | ~9.79, ~5.49 | Solid (—) | — | — | Solid (—) |

TABLE 1-continued

Results from Examples 1-6

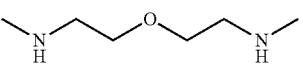

| Amine (pK$_a$) | Base (pK$_a$) | ΔpK$_a$ | Mol % Loading Mixed Carbamates in CO$_2$ flow (Mol % CO$_2$ after Desorption in N$_2$ flow) | | | |
|---|---|---|---|---|---|---|
| | | | 30° C. | 50° C. | 70° C. | 90° C. |
| Aniline (4.6) | 1,5-bis(methylamino)-3-oxapentane (9.87) | ~5.27 | ~10/~70## (—) | — | — | — | per each amine site of difunctional molecule
~10% of BMAOP molecules formed mixed carbamate with aniline; ~70% of BMAOP formed carbamic acid with CO$_2$.

Example 7

Mixed Carbamate Formation with Aniline/PEI

Aniline can be an effective nucleophile but a much weaker base (pKa ~4.5) than the amines of polyethylenimine. In combination, it was expected that the aniline nitrogen would nucleophilically add to the CO$_2$ carbon to generate the carbamate anion and the more basic polyethylenimine amines would act as proton acceptors and form the ammonium cations. By contrast, a ~17 wt % of PEI (average MW~600) in aniline solution (with a drop of DMSO-d$_6$ added) quickly formed a gel-like viscous mixture after CO$_2$ bubbling at ~5 cc/min The same behavior was observed with an ~11 wt % of PEI in aniline, albeit slower (~30 minutes in ~5.5 cc/min of CO$_2$ flow). Liquid phase NMR ($^{13}$C and $^1$H) spectra of the intermediate reaction stage appeared to show inter-/intra-PEI carbamates at ~164.8 ppm only (no PEI-aniline mixed carbamate was detected). This experiment indicated that the primary and secondary amines of PEI were observed to be more nucleophilic than aniline, and appeared to provide both the nucleophilic and proton-accepting roles required to form the intra-/inter-molecular carbamates with other PEI molecules, ignoring the weaker aniline base.

Example 8

Mixed Carbamate Formation with TMG/PEI

Figure 10:
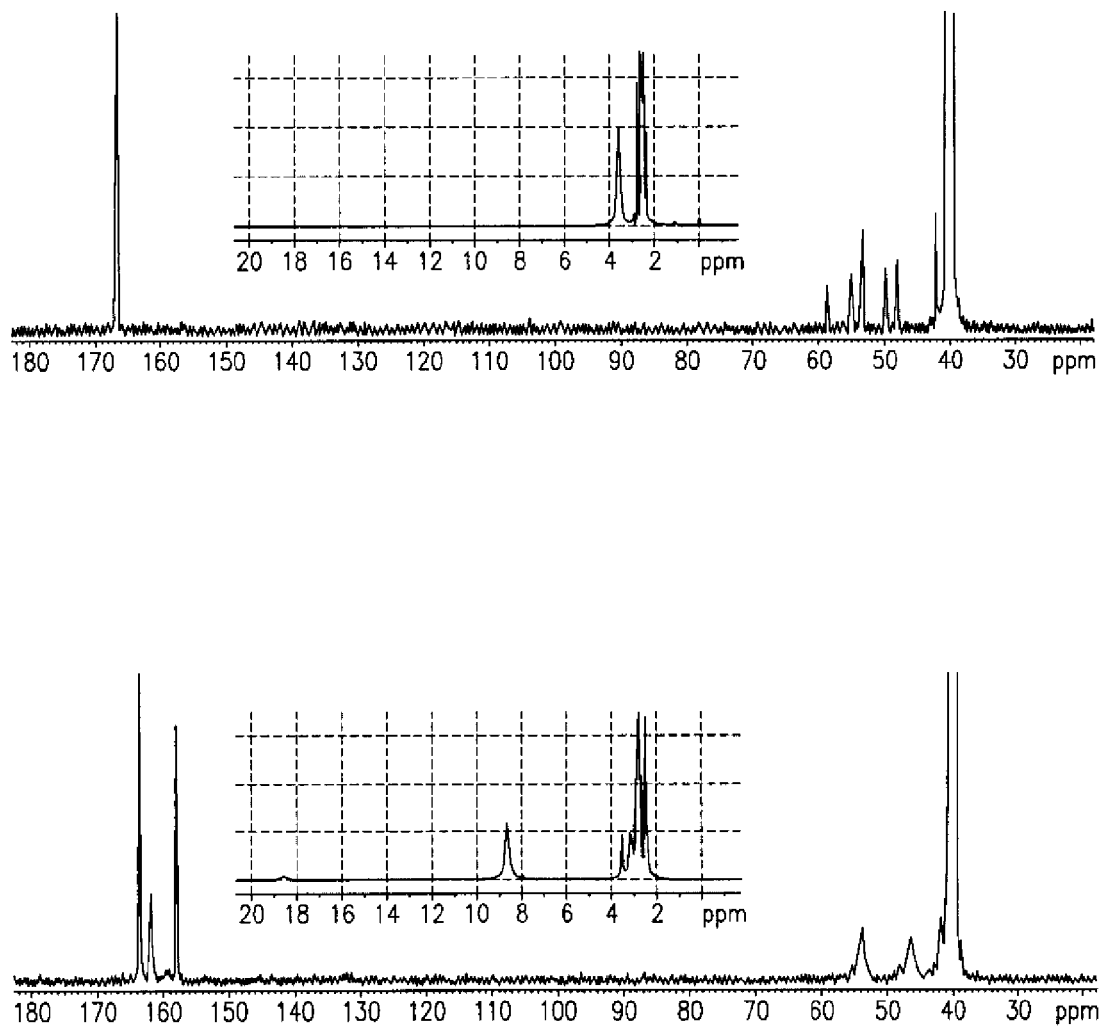
FIG. 10 shows $^{13}$C NMR spectra of ~1:23 PEI/TMG mixture in DMSO-$d_6$ before (top) and after (bottom) reaction with $CO_2$ at ambient temperature and pressure.

A ~30 wt % solution of PEI with tetramethylguanidine (~1:23 molar ratio) in DMSO-d$_6$ showed no signs of agglomeration or precipitation after ~9 hours of reaction with bubbling CO$_2$. $^{13}$C and $^1$H NMR spectra (FIG. 10, bottom) indicated the presence of two reaction products with CO$_2$. The peak at ~161.79 ppm indicated a mixed carbamate between TMG and the amines of PEI, while the peak at ~157.89 ppm appeared to reflect dicarboxylation of primary amines (reaction of a single primary amine with two CO$_2$ molecules) stabilized by two TMG molecules. Based on the ratio of the integrated peak areas to the C=N peak of TMG at ~163.57 ppm, the total CO$_2$ loading per TMG was calculated to be ~36.7 mol % and ~39.5 mol %, respectively, giving a total of ~76.2 mol %. Taking into account the ~1:23 molar ratio between PEI and TMG, the CO$_2$ loading per average PEI molecule were calculated to be ~1750 mol % (or ~17.5 CO$_2$ molecules per average PEI(600) molecule). Without stabilization with TMG, an average PEI molecule can accept about 5.5 CO$_2$ (assuming ~100% carbamate formation with all available primary and secondary amine) or less; however, PEI alone appears to rapidly react with CO$_2$ to form a viscous gel with limited CO$_2$ uptake. Here it was shown that stabilization with the strong base (TMG) can prevent agglomeration of the polyamine and can dramatically increase the CO$_2$ loading of the solution by better utilization of amine sites.

Example 9

PEI-MEH Reaction with CO$_2$ in DMSO with and without Aniline

Figure 11:
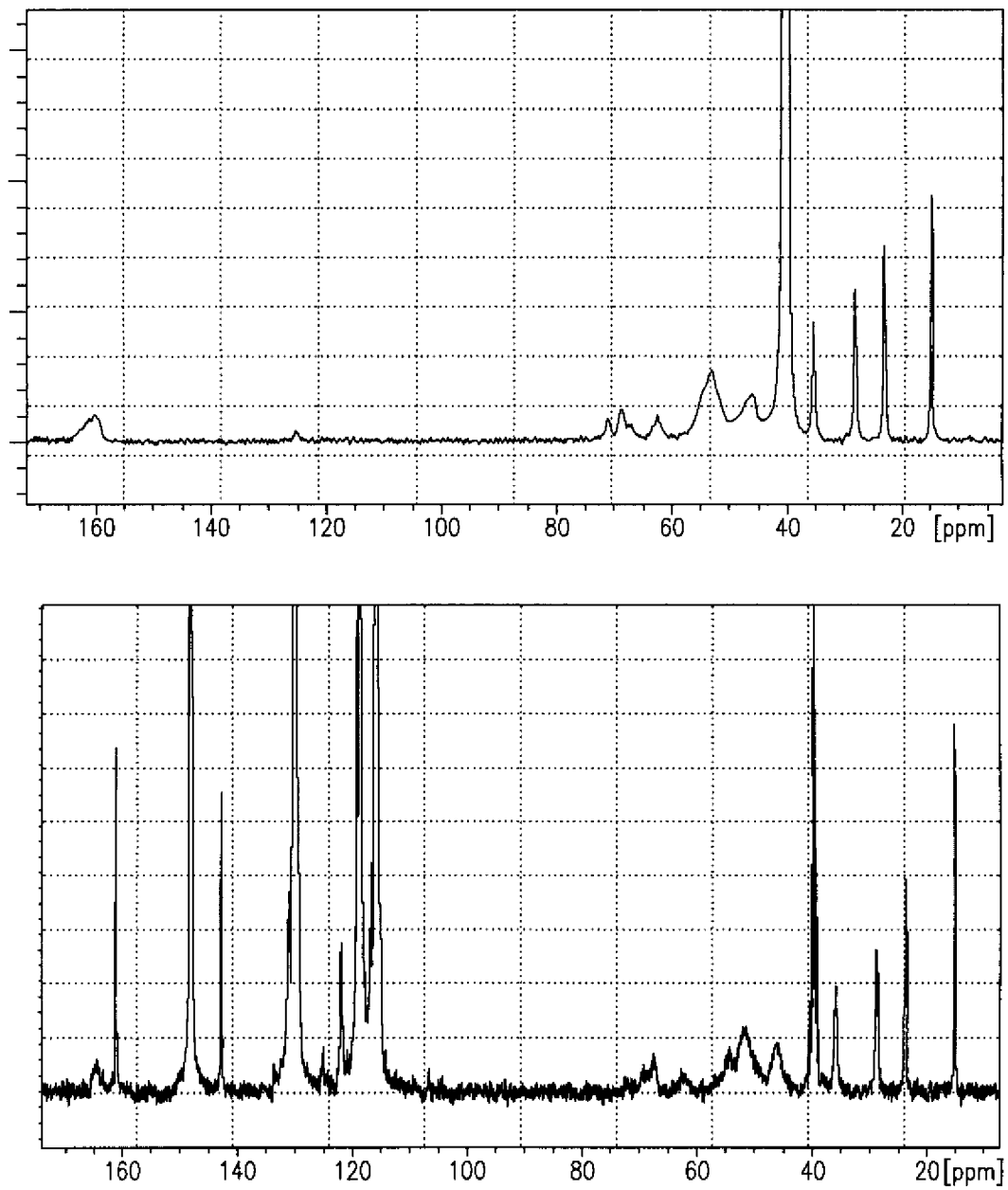
FIG. 11 shows $^{13}$C NMR spectra of a $CO_2$-saturated PEI-MEH polymer in DMSO-$d_6$ solution (top) and in aniline solution (bottom).

PEI-MEH samples were synthesized by partial epoxylation of the secondary and primary amines of commercially available PEI$_{600}$ to reduce the average number of primary amines from ~6 to ~2 per average PEI(600) molecule. A ~15 wt % DMSO-d$_6$ solution of this PEI-MEH did not form a gel after reaction with CO$_2$. $^{13}$C NMR spectra of the reaction product (FIG. 11, top) showed chemisorbed CO$_2$ by a broad peak at ~160.35 ppm (~5.1 CO$_2$ per PEI-MEH) and physisorbed CO$_2$ by a peak at ~125.16 ppm (~0.5 CO$_2$ per PEI-MEH).

When the unreactive DMSO-d$_6$ solvent was replaced by a more reactive aniline solvent, the PEI-MEH molecules appeared to absorb CO$_2$ more efficiently. The $^{13}$C NMR spectra of the reaction product (FIG. 11, bottom) showed both [PEI-MEH]$^-$ [PEI-MEH]$^+$ carbamate at ~164.58 ppm (~2.6 CO$_2$ per PEI-MEH) and [PEI-MEH] [aniline] mixed carbamate at ~161.13 ppm (~4.3 CO$_2$ per PEI-MEH). Total CO$_2$ loading for ~10 wt % PEI-MEH in aniline solution was calculated to be ~6.9 CO$_2$ molecules per average PEI-MEH, or about 1.35 times higher than in unreactive DMSO-d$_6$ solution. The [PEI-MEH] [aniline] mixed carbamate appeared relatively unstable and was decomposable at room temperature (~20-25° C.) by flowing N$_2$ gas through solution. At these conditions, [PEI-MEH]$^-$ [PEI-MEH]$^+$ carbamate appeared to be more stable and did not appear to decompose at room temperature (spectra not shown).

Example 10

PEI-MEH/TMG in DMSO-d$_6$ Solution

Figure 12:
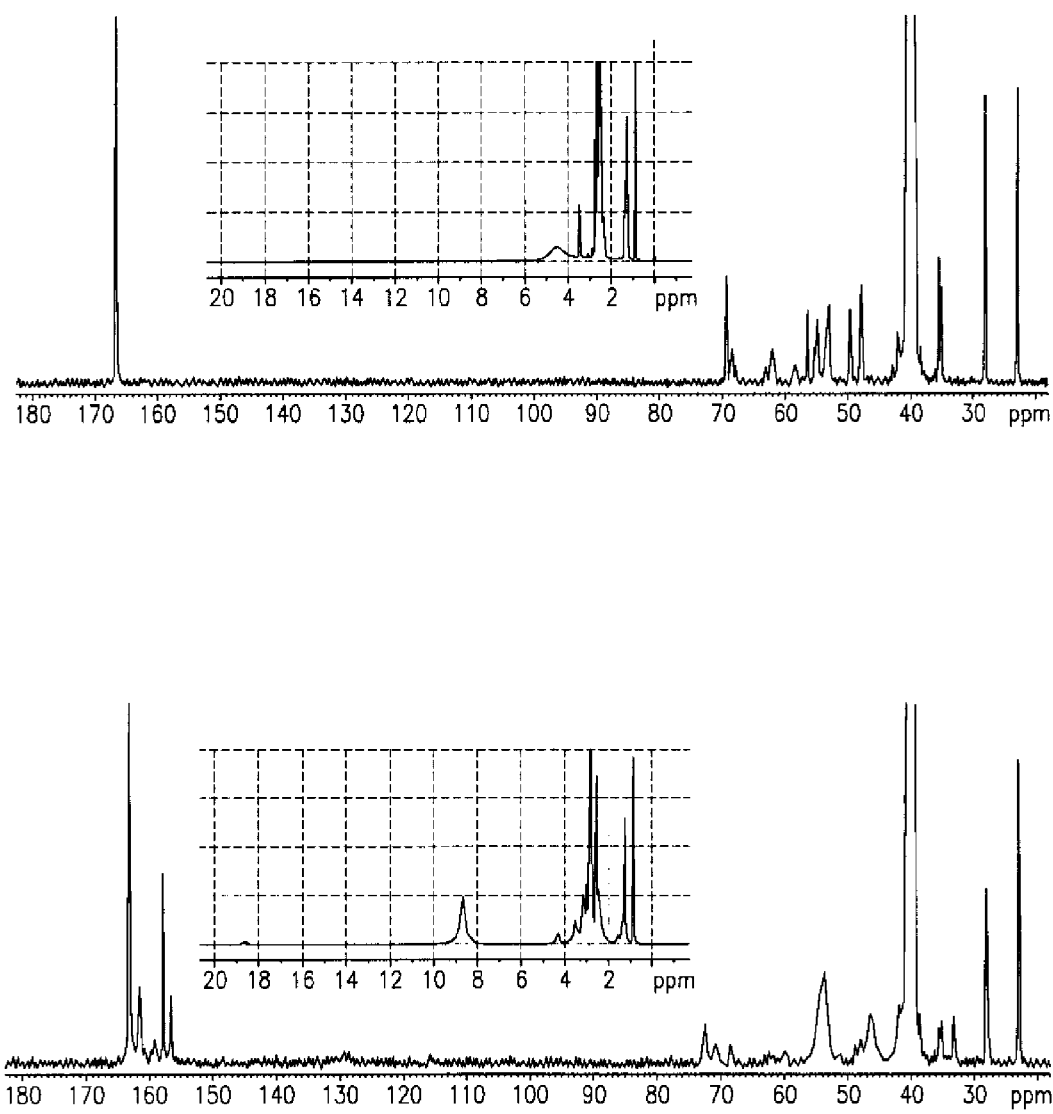
FIG. 12 shows $^{13}$C NMR spectra of ~1:21 PEI-MEH/TMG mixture in DMSO-$d_6$ before (top) and after (bottom) reaction with $CO_2$ at ambient temperature and pressure.

Similar to Example 7, a mixture of PEI-MEH/TMG (~1:21 mole ratio) in d$_6$-DMSO was reacted with CO$_2$ at room temperature. The $^{13}$C NMR spectra (with insert $^1$H NMR spectra) before and after CO$_2$ flow for ~8 hours are shown in FIG. 12. Based on peak integrations of the new peaks at ~161.63, ~159.23, ~157.81, and ~156.63 ppm, believed to represent various reaction products on primary and secondary amines of PEI-MEH, the $CO_2$ loading was calculated to be ~61 mol %, based on the molar concentration of TMG. Based on the starting ~1:21 molar ratio of PEI-MEH and TMG, ~12.81 $CO_2$ molecules appeared to react on average per molecule of PEI-MEH. Overall, the $CO_2$ loading with PEI-MEH in TMG solution was ~1.91 times higher than in weakly basic aniline solution and ~2.51 times higher than in unreactive DMSO-$d_6$ solution.

Example 11

PEI-CHO Reaction with $CO_2$ in DMSO CDCl$_3$ and Aniline

Figure 13:
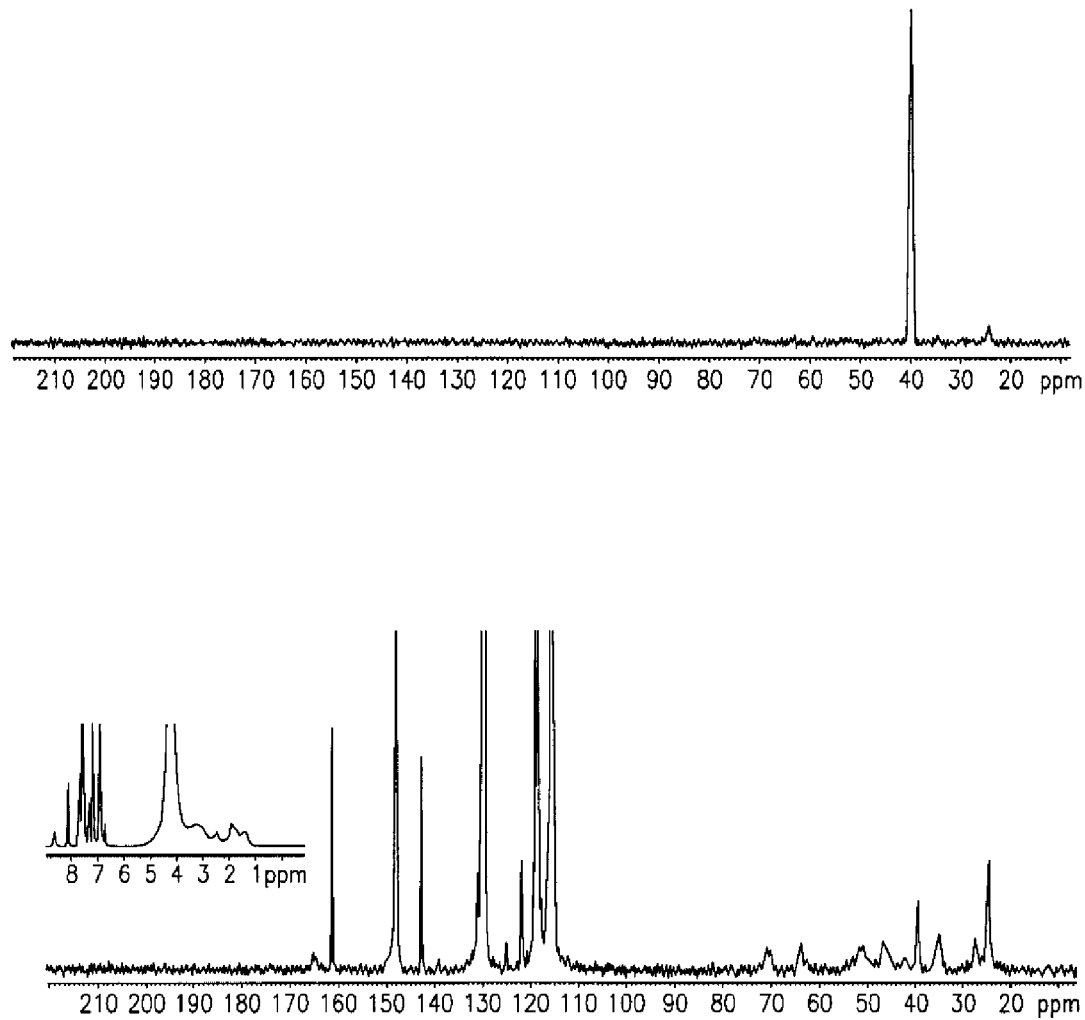
FIG. 13 shows $^{13}$C NMR spectra of a $CO_2$-saturated PEI-CHO polymer in DMSO-$d_6$ solution (top) and in aniline solution (bottom).

PEI-CHO samples were synthesized by selective epoxylation of substantially all primary amines of commercially available PEI$_{600}$. Solutions of PEI-CHO in both DMSO and CDCl$_3$ at ~15 wt % formed viscous gels upon reaction with $CO_2$ at room temperature (~20-25° C.). $^{13}C$ NMR spectra of $CO_2$ saturated DMSO-$d_6$ solution reflected only trace amounts of PEI-CHO in the liquid phase (FIG. 13, top). Most of the product appeared to form cross-linked gel by formation of intermolecular [PEI-CHO]$^-$ [PEI-CHO]$^+$ carbamates.

In the reactive aniline solvent, PEI-CHO reacted with $CO_2$ to largely form [PEI-CHO][aniline] mixed carbamates, with reduced formation of the gel-forming intermolecular carbamate. $^{13}C$ NMR spectra of reaction product (FIG. 13, bottom) showed two types of reaction products: [PEI-CHO]$^-$ [PEI-CHO]$^+$ mixed carbamate at ~164.70 ppm (~3.2 $CO_2$ per PEI-CHO) and [PEI-CHO][aniline] mixed carbamate at ~161.13 ppm (~7.1 $CO_2$ per PEI-CHO). Total $CO_2$ loading for ~10 wt % PEI-CHO in aniline solution was calculated to be ~10.3 $CO_2$ molecules per average PEI-CHO. Formed at room temperature, [PEI-CHO][aniline] carbamate appeared to be relatively unstable and was decomposable at ambient conditions by bubbling $N_2$ gas through solution. At these conditions, [PEI-CHO]$^-$ [PEI-CHO]$^+$ mixed carbamate appeared more stable and didn't decompose at room temperature (spectra not shown).

Example 12

PEI-CHO/TMG in DMSO Solution

Figure 14:
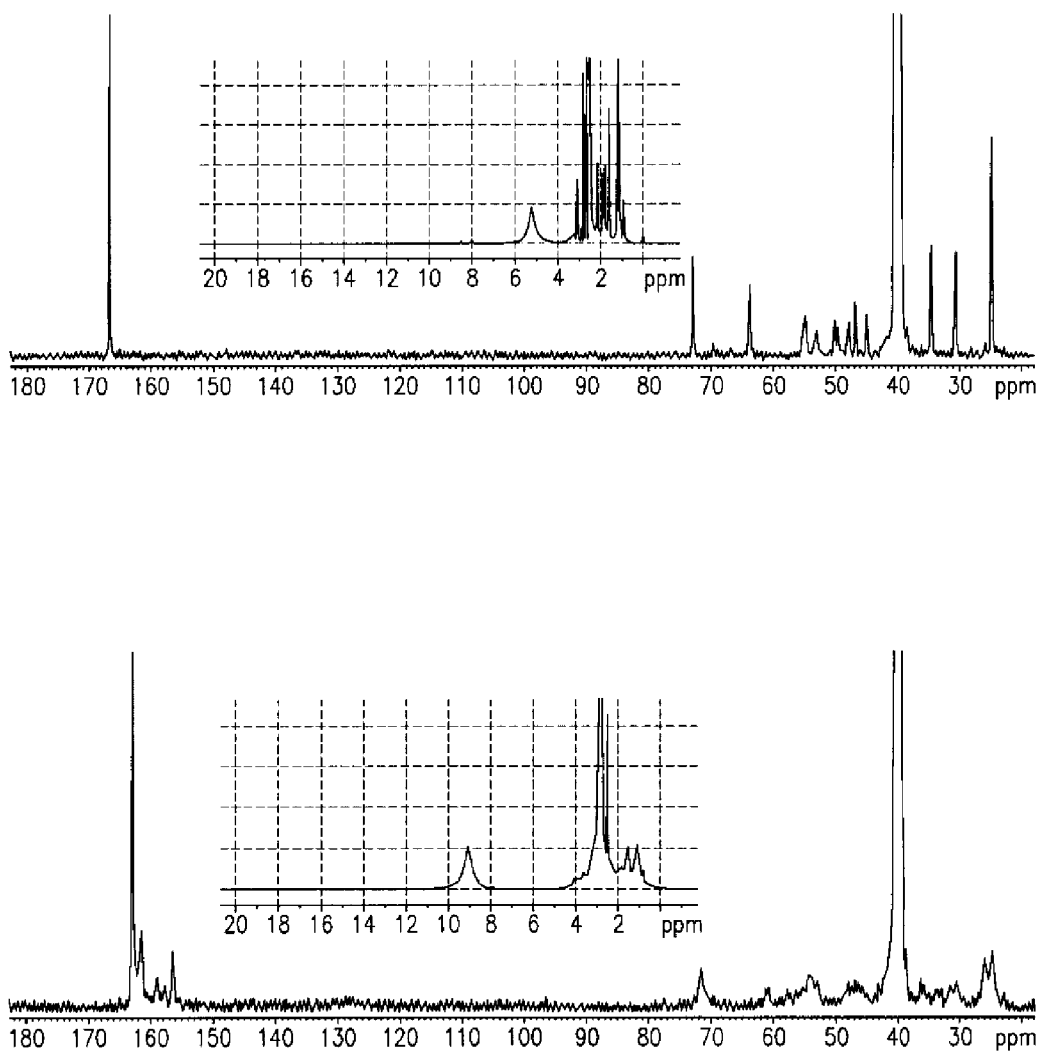
FIG. 14 shows $^{13}$C NMR spectra of ~1:21 PEI-CHO/TMG mixture in DMSO-$d_6$ before (top) and after (bottom) reaction with $CO_2$ at ambient temperature and pressure.

A procedure similar to Example 7 was carried out using a ~1:21 mixture of PEI-CHO/TMG in $d_6$-DMSO. The $^{13}C$ NMR spectra (with insert $^1H$ NMR spectra) before and after $CO_2$ flow for ~14 hours are shown in FIG. 14. Integration of the new peaks at ~161.49, ~159.01, ~157.84, and ~156.49 ppm, believed to represent various reaction products on the secondary amines of PEI-CHO, indicated a $CO_2$ loading of ~63.4 mol % per TMG molecules. Based on the starting ~1:21 molar ratio of PEI-CHO and TMG, ~13.3 $CO_2$ molecules reacted per average molecule of PEI-CHO. Comparison with Example 11 showed that the $CO_2$ loading of PEI-CHO/TMG was ~1.29 times higher than in weakly basic aniline solution.

Example 13

Vapor-Liquid Equilibrium of EEA/TMG and $CO_2$ in $d_6$-DMSO

An approximately 62.2 wt % solution of ~1:1 molar mixture of ethoxyethylamine (EEA) and tetramethylguanidine (TMG) in $d_6$-DMSO was heated to ~45° C. and then treated with a continuous flow of ~1 vol % $CO_2$ in $N_2$ at ~1 atm (~100 kPag), as described in the General Procedure. The solution was next treated with ~10 vol % $CO_2$ in $N_2$ at ~1 atm, and finally ~100 vol % $CO_2$ at ~1 atm. The equilibrium loading of $CO_2$ per solution at these conditions was ~13.9 wt %, ~13.9 wt %, and ~16.6 wt %, respectively, and represented an EEA/TMG/$CO_2$ vapor-liquid equilibrium at ~10 mbar (~1 kPa), ~100 mbar (~10 kPa), and ~1 bar (~100 kPa) of $CO_2$ at ~45° C.

Figure 15:
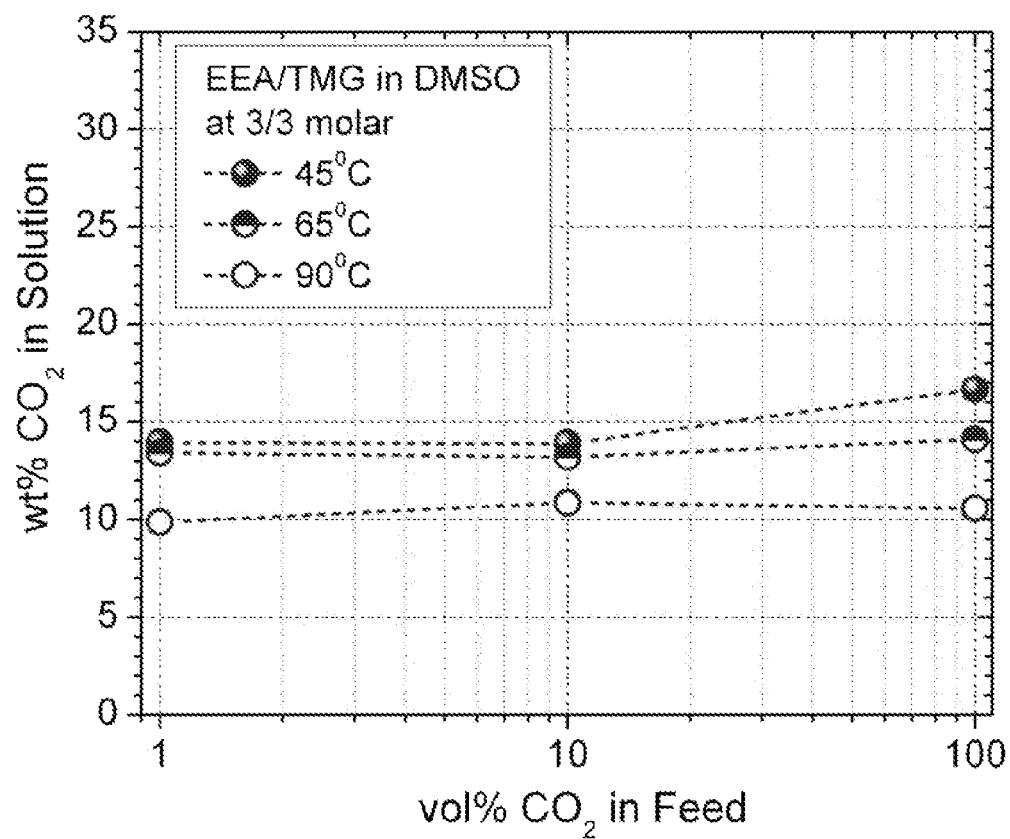
FIG. 15 shows a vapor-liquid equilibrium graph for the EEA/TMG system with $CO_2$ (Example 13).

The same procedure was carried out with a fresh ~1:1 molar mixture of EEA and TMG in DMSO-$d_6$ solution at ~65° C. and ~90° C. The monitoring results shown in FIG. 15 indicated not only a relatively large $CO_2$ uptake capacity (103.7 mol %) at absorber conditions (~45° C., ~10 vol % $CO_2$) but also a relatively high $CO_2$ loading at relatively low $CO_2$ fugacity (103.0 mol % at ~45° C., ~1 vol % $CO_2$). These results appear to confirm that primary amines (such as EEA) in solution with strong base (such as TMG and/or other guanidines/amidines) can effectively capture more than ~90% $CO_2$ from flue gas with high capacity. Based on high $CO_2$ loading at fugacity ~0.1 atm (~10 kPa) and ~65° C./~90° C. (~13.2/~10.8 wt %, respectively), such solutions can be used for $CO_2$ capture at elevated temperatures (at least ~60° C.), which can decrease the hardware and corresponding cost of flue gas cooling.

What is claimed is:

1. A cyclic process for separating $CO_2$ from a gas stream, which process comprises: dehumidifying the gas stream to remove substantial quantities of water therefrom; contacting the dehumidified gas stream with an absorbent system comprising a non-aqueous aprotic solvent, an amine $CO_2$ sorbent, and a non-nucleophilic base having a $pK_a$ at least 3 units higher than that of the amine at a temperature above 50° C. to sorb $CO_2$, wherein the contacting of the absorbent system with the dehumidified gas stream results in formation of a stabilized mixed carbamate in which the $CO_2$ forms a carbamate by reaction with the amine sorbent and in which a protonated form of the non-nucleophilic base forms a stabilizing counterion for the carbamate; and treating the absorbent system containing the sorbed $CO_2$ under conditions sufficient to cause desorption of at least a portion of the $CO_2$.

2. The process of claim 1, wherein the amine sorbent comprises a primary amine, a secondary amine, or mixture thereof.

3. The process of claim 1, wherein the amine sorbent comprises a primary or secondary aliphatic, cycloaliphatic, or aromatic amine, or mixture thereof.

4. The process of claim 3, wherein the aliphatic amine comprises a primary amine selected from: monoethanolamine, 2-amino-2-methyl- 1-propanol, 2-(2-aminoethylamino)ethanol, 2-amino-2-hydroxymethyl- 1,3-propanediol, diglycolamine, 2-ethoxyethylamine, 2-n-propoxyethylamine, 1,5-diamino-3-oxapentane, 3-aminopropionitrile, aminoacetonitrile, or hydroxyetliyletiediamine.

5. The process of claim 3, wherein the amine comprises a secondary amine selected from piperidine, piperazine, diethanolamine, diisopropanolamine, 1,5-bis(methylamino)-3-oxapentane, bis(2-methoxyethyl)amine, bis(2-ethoxyethyl)amine, ethoxyethanol tertiarybutylamine, or 3,3'-iminodipropionitrile.

6. The process of claim 3, wherein the aliphatic amine comprises aniline.

7. The process of claim 1, wherein the non-nucleophilic base comprises an amine, an imine, an amidine, a guanidine, or a biguanide.

8. The process of claim 7, wherein the non-nucleophilic base has a $pK_a$ of at least 8.5.

9. The process of claim 8, wherein the non-nucleophilic base has a $pK_a$ of at least 9.

10. The process of claim 9, wherein the non-nucleophilic base has a $pK_a$ of at least 10.

11. The process of claim 10, wherein the non-nucleophilic base has a $pK_a$ of at least 13.

12. The process of claim 1, wherein the amine has a $pK_a$ not greater than 11.5.

13. The process of claim 8, wherein the amine has a $pK_a$ not greater than 11.5.

14. The process of claim 12, wherein the amine has a $pK_a$ not greater than 10.

15. The process of claim 14, wherein the amine has a $pK_a$ not greater than 9.

16. The process of claim 1, wherein the non-nucleophilic base has a $pK_a$ of at least 7 units higher than that of the amine.

17. The process of claim 1, wherein the dehumidified gas stream is contacted with the absorbent at a temperature of at least 70° C. but not more than 100° C.

18. The process of claim 17, wherein the dehumidified gas stream is contacted with the absorbent at a temperature of at least 90° C. but not more than 100° C.

19. The process of claim 1, wherein the $CO_2$ is desorbed from the absorbent containing the sorbed $CO_2$ at a temperature of at least about 100° C. to cause desorption of at least a portion of the sorbed $CO_2$.

20. The process of claim 15, wherein the $CO_2$ is desorbed from the absorbent containing the sorbed $CO_2$ at a temperature from 100 to 120° C.

21. The process of claim 1, wherein the amine and the non-nucleophilic base are dissolved in a polar, aprotic solvent having a boiling point of at least 65° C.

22. The process of claim 1, wherein the amine or the non-nucleophilic base is integrated onto a porous support.

23. The process of claim 1, wherein the amine and the non-nucleophilic base are integrated onto a porous support.

24. The process of claim 22, wherein the porous support is comprised of a, material selected from carbon, alumina, silica, silica-alumina, magnesia, zeolites, and solid porous polymers.

25. The process of claim 23, wherein the porous support is comprised of a material selected from carbon, alumina, silica, silica-alumina, magnesia, zeolites, and solid porous polymers.

26. The process of claim 1, wherein the amine comprises a polyamine having both primary and secondary amine groups, having both secondary and tertiary amine groups, or having each of primary, secondary, and tertiary amine groups.

27. The process of claim 21, wherein the non-aqueous polar aprotic solvent is selected from the group consisting of toluene, acetonitrile, dimethylformatnide, dimethylsulfoxide, tetrahydrofuran, methyl ethyl ketone, ethyl acetate, amyl acetate, 1,2-orthodichlorobenzene, and combinations thereof.

* * * * *